United States Patent
Zaccari et al.

(10) Patent No.: US 10,753,861 B2
(45) Date of Patent: Aug. 25, 2020

(54) METHODS FOR COLORIMETRIC ANALYSIS

(71) Applicant: Sumitomo Chemical Company Limited, Tokyo (JP)

(72) Inventors: Irene Zaccari, Cambridgeshire (GB); Matthew Roberts, Cambridge (GB)

(73) Assignee: Sumitomo Chemical Company Limited, Tokyo (JP)

( * ) Notice: Subject to any disclaimer, the term of this patent is extended or adjusted under 35 U.S.C. 154(b) by 113 days.

(21) Appl. No.: 15/961,132

(22) Filed: Apr. 24, 2018

(65) Prior Publication Data

US 2018/0306709 A1    Oct. 25, 2018

(30) Foreign Application Priority Data

Apr. 25, 2017    (GB) .................................. 1706572.3

(51) Int. Cl.
*G06K 9/00*     (2006.01)
*G01N 21/31*    (2006.01)
(Continued)

(52) U.S. Cl.
CPC ..... *G01N 21/3103* (2013.01); *G01N 21/6456* (2013.01); *G01N 21/8483* (2013.01);
(Continued)

(58) Field of Classification Search
CPC ........................................... G06T 2207/30024
See application file for complete search history.

(56) References Cited

U.S. PATENT DOCUMENTS

| | | | |
|---|---|---|---|
| 2006/0204071 A1* | 9/2006 | Ortyn ................... | G01J 3/2889 382/133 |
| 2017/0011517 A1* | 1/2017 | Coutard ................. | G06T 7/0016 |
| 2017/0154438 A1* | 6/2017 | Kisner ................... | G06T 5/001 |

FOREIGN PATENT DOCUMENTS

| | | |
|---|---|---|
| EP | 2 992 805 A1 | 3/2016 |
| WO | WO 2004/096033 A1 | 11/2004 |
| WO | WO 2015/108820 A1 | 7/2015 |

OTHER PUBLICATIONS

Carrio et al. "Automated Low-Cost Smartphone-Based Lateral Flow Saliva Test Reader for Drugs-of-Abuse Detection" Sensors 2015, 15, 29569-29593; doi:10.3390/s151129569, 2015 (Year: 2015).*

(Continued)

*Primary Examiner* — Oneal R Mistry
(74) *Attorney, Agent, or Firm* — Wolf, Greenfield & Sacks, P.C.

(57) ABSTRACT

A method includes determining the presence or concentration of an analyte in a sample. Determining the presence or concentration of an analyte in a sample includes receiving a first image containing an image of the sample, the first image obtained using an image sensor having two or more colour channels. Determining the presence or concentration of an analyte in a sample includes extracting first and second mono-colour arrays from the first image, the first and second mono-colour arrays corresponding to different colour channels of the image sensor, wherein each mono-colour array comprises one or more entries and each entry is determined by aggregating one or more pixels of the first image. Determining the presence or concentration of an analyte in a sample includes determining a filtered array based on the first and second mono-colour arrays, each entry of the filtered array calculated as a ratio of the corresponding entries of the first and second mono-colour arrays, or calculated as a difference of the corresponding entries of the first and second mono-colour images. Determining the presence or concentration of an analyte in a sample includes determining the presence or concentration of the analyte based on the filtered array.

17 Claims, 18 Drawing Sheets

(51) Int. Cl.
*G06T 7/90* (2017.01)
*G01N 21/64* (2006.01)
*G01N 21/84* (2006.01)
*G01N 21/78* (2006.01)

(52) U.S. Cl.
CPC ................ *G06T 7/90* (2017.01); *G01N 21/78* (2013.01); *G06T 2207/10024* (2013.01); *G06T 2207/10048* (2013.01); *G06T 2207/30004* (2013.01); *G06T 2207/30024* (2013.01)

(56) References Cited

OTHER PUBLICATIONS

GB1706572.3, Sep. 26, 2017, Combined Search and Examination Report.
Combined Search and Examination Report for British Application No. 1706572.3, dated Sep. 26, 2017.

\* cited by examiner

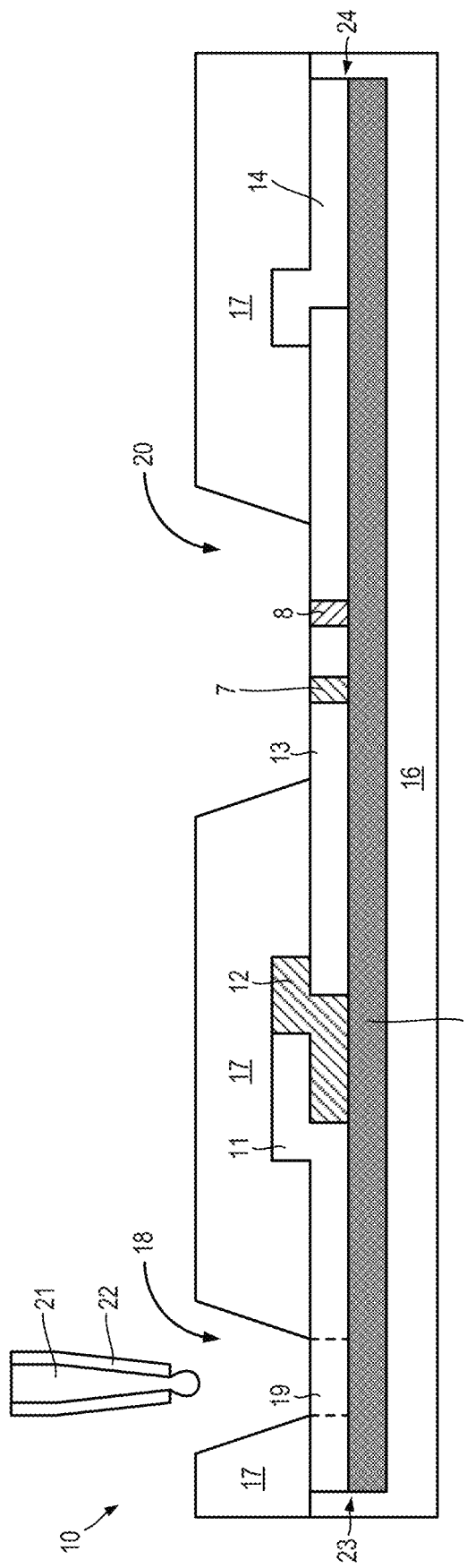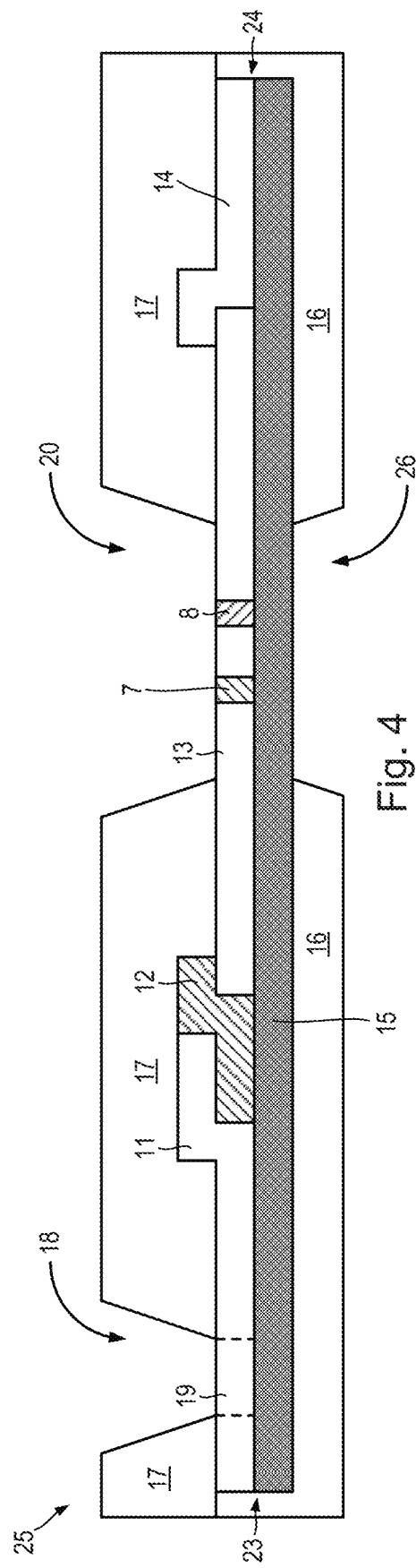

METHODS FOR COLORIMETRIC ANALYSIS

RELATED APPLICATIONS

This application claims foreign priority benefits are under 35 U.S.C. § 119(a)-(d) or 35 U.S.C. § 365(b) of British application number GB1706572.3, filed Apr. 25, 2017, the entirety of which is incorporated herein.

FIELD OF THE INVENTION

The present invention relates to methods of colorimetric analysis of samples which may comprise one or more analytes, each analyte having an associated colour.

BACKGROUND

Biological testing for the presence and/or concentration of an analyte may be conducted for a variety of reasons including, amongst other applications, preliminary diagnosis, screening samples for presence of controlled substances and management of long term health conditions.

Lateral flow devices (also known as "lateral flow immunoassays") are one variety of biological testing. Lateral flow devices may be used to test a liquid sample such as saliva, blood or urine, for the presence of an analyte. Examples of lateral flow devices include home pregnancy tests, home ovulation tests, tests for other hormones, tests for specific pathogens and tests for specific drugs. For example, EP 0 291 194 A1 describes a lateral flow device for performing a pregnancy test.

In a typical lateral flow testing strip, a liquid sample is introduced at one end of a porous strip which is then drawn along the strip by capillary action (or "wicking"). A portion of the lateral flow strip is pre-treated with labelling particles that have been activated with a reagent which binds to the analyte to form a complex (if the analyte is present in the sample). The bound complexes and any unreacted labelling particles continue to propagate along the strip before reaching a testing region which is pre-treated with an immobilised binding reagent that binds bound complexes of analyte and labelling particles and does not bind unreacted labelling particles. The labelling particles have a distinctive colour, or other detectable optical property such as fluorescence. The development of a concentration of labelling particles in the test regions provides an observable indication that the analyte has been detected. Lateral flow test strips may be based on, for example, colorimetric labelling using gold or latex nanoparticles. Fluorescent colorimetry employs marker molecules which fluoresce a specific colour.

Another variety of biological testing involves assays conducted in liquids held in a container such as a vial, a PCR well or plate, a cuvette or a microfluidic cell. Liquid assays may be measured based on colorimetric measurements in reflection, transmission or fluorescence arrangements. An advantage of some liquid based assays is that they may allow tests to be conducted using very small (e.g. picolitre) volumes. However, in such small volumes, the desired colour change or fluorescence may be difficult to detect.

Sometimes, merely determining the presence or absence of an analyte is desired, i.e. a qualitative colorimetric test. In other applications, an accurate concentration of the analyte may be desired, i.e. a quantitative colorimetric test. Mobile devices including cameras, for example smart phones, have been widely adopted. It has been suggested to employ such mobile devices to perform quantitative analysis of the results of colorimetric lateral flow tests.

SUMMARY

According to a first aspect of the invention there is provided a method including determining the presence or concentration of an analyte in a sample. Determining the presence or concentration of an analyte in a sample includes receiving a first image containing an image of the sample, the first image obtained using an image sensor having two or more colour channels. Determining the presence or concentration of an analyte in a sample includes extracting first and second mono-colour arrays from the first image, the first and second mono-colour arrays corresponding to different colour channels of the image sensor, wherein each mono-colour array comprises one or more entries and each entry is determined by aggregating one or more pixels of the first image. Determining the presence or concentration of an analyte in a sample includes determining a filtered array based on the first and second mono-colour arrays, each entry of the filtered array calculated as a ratio of the corresponding entries of the first and second mono-colour arrays, or calculated as a difference of the corresponding entries of the first and second mono-colour images. Determining the presence or concentration of an analyte in a sample includes determining the presence or concentration of the analyte based on the filtered array.

Signals resulting from background inhomogeneity of the sample may be reduced or removed in the filtered array. In this way, both the minimum detectable concentration of the analyte and the resolution with which a concentration of the analyte may be determined may be improved.

Each pixel of each image obtained using the image sensor may include an intensity value corresponding to each colour channel.

Each entry of each mono-colour array may correspond to aggregating a row or a column of the first image, to aggregating the pixels of the first image within a region of interest, or to a single pixel of the first image, wherein each mono-colour array may be a mono-colour image and the filtered array may be a filtered image. Aggregating may including summing. Aggregating may including obtaining a mean, median or mode average.

Receiving the first image may include using the image sensor to obtain the first image.

Determining the presence or concentration of an analyte in a sample may include receiving a calibration array comprising one or more entries, each entry corresponding to a reference concentration of the analyte, wherein determining the presence or concentration of the analyte based on the filtered array comprises comparing each entry of the filtered array with one or more entries of the calibration array. The filtered array and the calibration array need not have the same number of entries.

Receiving the calibration array may include retrieving the calibration array from a storage device or storage location.

Receiving the calibration array may include using the image sensor to obtain a second image containing an image of a calibration sample, the calibration sample including one or more calibration regions and each calibration region corresponding to a reference concentration of the analyte. Receiving the calibration array may include extracting first and second mono-colour calibration arrays from the second image, the first and second mono-colour calibration arrays corresponding to different colour channels of the image sensor, wherein each mono-colour calibration array comprises one or more entries and each entry is determined by aggregating the pixels of the second image corresponding to a calibration region. Receiving the calibration array may include determining the calibration array based on the first and second mono-colour calibration arrays, each entry of the calibration array calculated as a ratio of the corresponding entries of the first and second mono-colour calibration arrays, or as a difference of the corresponding entries of the first and second mono-colour calibration arrays. Aggregating may include summing. Aggregating may include obtaining a mean, median or mode average.

According to a second aspect of the invention there is provided a method including determining the presence or concentration of one or more analytes in a sample. Determining the presence or concentration of one or more analytes in a sample includes receiving a first image containing an image of the sample, the first image obtained using an image sensor having two or more colour channels. Determining the presence or concentration of one or more analytes in a sample includes extracting, from the first image, a mono-colour array corresponding to each colour channel, wherein each mono-colour array comprises one or more entries and each entry is determined by aggregating one or more pixels of the first image. Determining the presence or concentration of one or more analytes in a sample includes determining a mono-colour absorbance array corresponding to each colour channel, wherein each entry of each mono-colour absorbance array is an absorbance value determined based on the corresponding entry of the mono-colour array of the same colour channel. Determining the presence or concentration of one or more analytes in a sample includes determining, for each entry of the mono-colour absorbance arrays, a concentration vector by generating an absorbance vector using the absorbance values from corresponding entries of each of the mono-colour absorbance arrays, and determining the concentration vector by multiplying the absorbance vector with a de-convolution matrix. Each concentration vector includes a concentration value corresponding to each of the one or more analytes.

Each pixel of the first image may include an intensity value corresponding to each colour channel.

Each entry of each mono-colour array may correspond to aggregating a row or a column of the first image, to aggregating the pixels of the first image within a region of interest, or to a single pixel of the first image, wherein each mono-colour array may be a mono-colour image and the filtered array may be a filtered image. Aggregating may include summing. Aggregating may include obtaining a mean, median or mode average.

Receiving the first image may include using the image sensor to obtain the first image.

The image sensor may include red, green and blue colour channels. The image sensor may include an infra-red colour channel. The image sensor may include cyan, yellow and magenta colour channels. The image sensor may include an ultraviolet colour channel.

The methods may be applied to each frame of a video, wherein receiving a first image may include extracting a frame from the video.

The sample may be illuminated by ambient light. The sample may be illuminated using a light source.

The methods may include illuminating the sample using a light source, wherein the sample and image sensor are arranged to be screened from ambient light.

The light source may be a broadband light source. The light source may include two or more types of light emitter, and each type of light emitter may emit light of a different colour. The light source may include an ultra-violet light source and the colour associated with the analyte may arise from fluorescence.

The methods may include arranging the sample within a sample holder having a fixed geometric relationship with the image sensor. The methods may include arranging the sample within a sample holder having a fixed geometric relationship with the image sensor and a light source.

The first image may be obtained using light transmitted through the sample. The first image may be obtained using light reflected from the sample. The second image may be obtained using light transmitted through the calibration sample. The second image may be obtained using light reflected from the calibration sample.

The image sensor may form part of a camera. The light source may be integrated into the camera.

The image sensor may form part of a mobile device.

The mobile device may include one or more processors, and the step of determining the presence or concentration of an analyte or of one or more analytes may be carried out by the one or more processors.

Receiving the first image may include receiving a full sensor image which contains an image of the sample, identifying a first sub-region of the full sensor image which contains the sample and obtaining the first image by extracting the first sub-region.

Receiving the second image may include receiving a full sensor image which contains an image of the calibration sample, identifying a second sub-region of the full sensor image which contains the calibration sample and obtaining the second image by extracting the second sub-region.

The first and second sub-regions may correspond to different sub-regions of the same full sensor image. The first and second sub-regions may correspond to sub-regions of different full sensor images. The first and/or second sub-regions may be identified using computer vision techniques. The sample may include registration indicia for use in identifying the first and/or second sub-regions. The methods may also include arranging one or more objects on or around the sample and/or the calibration sample, each object including registration indicia for use in identifying the first and/or second sub-regions.

According to a third aspect of the invention there is provided a method of determining a de-convolution matrix, the method includes providing a number, K, of calibration samples, wherein each calibration sample comprises a known concentration of K different analytes. The method includes, for each calibration sample, determining, for each of a number K of colour channels, the absorbance values of the calibration sample, generating an absorbance vector using the K measured absorbance values and generating a concentration vector using the K known concentrations of analytes. The method also include generating a first K by K matrix by setting the values of each column, or each row, to be equal to the values of the absorbance vector corresponding to a given calibration sample. The method also includes inverting the first matrix. The method also includes generating a second K by K matrix by setting the values of each column, or each row, to be equal to the values of the concentration vector corresponding to a given calibration sample. The method also includes determining a deconvolution matrix by multiplying the second matrix by inverse of the first matrix. Each calibration sample may be a region of a single, larger calibration sample.

BRIEF DESCRIPTION OF THE DRAWINGS

Certain embodiments of the present invention will now be described, by way of example, with reference to the accompanying drawings in which:

FIG. 3 shows a cross section of a lateral flow device for measurements using reflected light;

FIG. 4 shows a cross section of a lateral flow device for measurements using transmitted light;

DETAILED DESCRIPTION OF CERTAIN EMBODIMENTS

Figure 1:
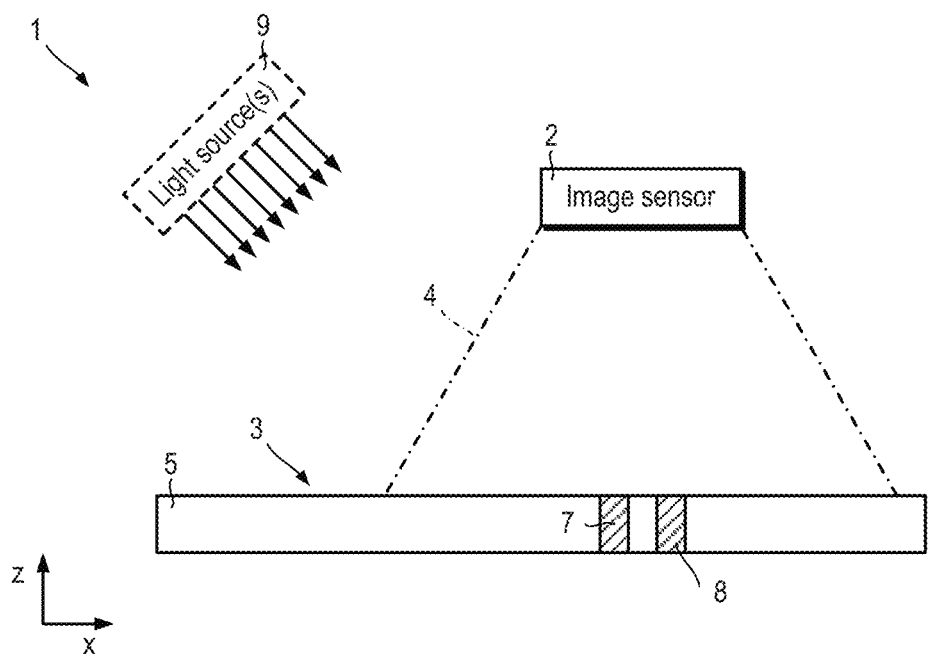
FIG. 1 illustrates a system for colorimetric analysis using reflected light.

In the following description, like parts are referred to using like reference numerals.

Colorimetric analysis of a sample involves analysing the concentration of a target analyte which may be present in the sample based on a colour associated with the target analyte. The colour associated with the target analyte may be inherent to the target analyte. Alternatively, the colour associated with the target analyte may be applied by, for example, reacting the target analyte with a reagent having a colour or with activated labelling particles. Colorimetric analysis may be qualitative, in other words concerned only with determining the presence or absence of the target analyte. Colorimetric analysis may be quantitative, such that the concentration of the target analyte may be determined. In quantitative colorimetric analysis, a sample is typically compared against a calibration sample or standard sample which corresponds to a reference concentration of the target analyte.

In both qualitative and quantitative colorimetric analysis, the minimum threshold for detecting a target analyte may be improved if the signal to noise ratio of the measurement could be improved. Additionally, improvements in the signal to noise ratio may also allow for the concentration of a target analyte to be determined with improved resolution during quantitative colorimetric analysis. In the present specification, noise is taken to refer to signals other than the desired signal, for example background inhomogeneity of a sample which may contain the target analyte.

The present specification is concerned with improving the signal-to-noise ratio for colorimetric analysis performed using an image sensor such as a camera. In one example, colorimetric analysis using a mobile device such as a smart phone or tablet computer may be conducted with improved signal-to-noise ratio. A mobile device may provide a good platform for colorimetric analysis because mobile devices typically include a camera to obtain images and a light for illuminating a sample, in addition to memory and one or more processors for processing the images according to the first or second methods of the present specification.

The present specification describes first and second methods by which non-specific background signals which are not associated with an analyte of interest may be filtered out in order to improve the signal-to-noise ratio of an image. The filtered image may then be used for colorimetric analysis having an improved limit of detection (i.e. a lower minimum detectable concentration) and also having improved resolution of the analyte concentration. The present specification is based, at least in part, on the realisation that many common sources of background signal may be correlated between different colour channels, whereas the desired signal is usually not correlated or only weakly correlated between different colour channels.

Referring to FIG. 1, a system for colorimetric analysis 1 is shown.

An image sensor 2 is arranged to capture an image of a sample 3. The sample 3 may contain a target analyte. The purpose of the system 1 is to determine whether or not the sample 3 does contain the target analyte and/or in what concentration. The image sensor 2 is typically combined with optics (not shown) and integrated into a camera. The image sensor 2 includes two or more colour channels.

A colour channel corresponds to a bandwidth of light to which an individual sensor of the image sensor 2 is sensitive. In many digital cameras different colour channels are provided by a filter mosaic (FIGS. 5A to 5D) overlying an array of light sensors. Each image captured by the image sensor 2 comprises an array of N by M pixels, where N and M are both positive, non-zero integers. An image may be denoted by an array I and the pixel corresponding to the $n^{th}$ of N row and the $m^{th}$ of M column of I may be denoted as $I_{n,m}$. Each pixel $I_{n,m}$ of each image is made up of a set of intensity values which correspond to each of the two or more colour channels. A pixel $I_{n,m}$ may be represented be a vector of corresponding intensity values, for example, $I_{n,m} = (I_{n,m,1}, \ldots, I_{n,m,k}, \ldots, I_{n,m,K})$ when the image sensor includes K different colour channels, where k is an integer denoting the $k^{th}$ colour channel and $1 \le k \le K$. Intensity values $I_{n,m,k}$ may take the form of measured voltages directly read from the image sensor 2 or processed (and possibly re-balanced) intensity values, for example, integer values between 0 and 255. Intensity values $I_{n,m,k}$ may be normalised globally to the image I, i.e. divided by the peak intensity of any colour channel, of normalised internally, i.e. values $I_{n,m,k}$ of the $k^{th}$ of K colour channels are divided by the peak intensity of the $k^{th}$ colour channel, i.e. $\max(I_{n,m,k})$. Such normalisation of intensity values does not substantially affect the methods described hereinafter.

For example, a common type of digital camera includes an image sensor 2 comprising three colour channels corresponding to red (R), green (G) and blue (B) light. This type of sensor shall be referred to herein as an RGB image sensor 2. In this case an image I is made up of pixels $I_{n,m} = (I_{n,m,R}, I_{n,m,G}, I_{n,m,B})$.

An image I captured by the image sensor 2 may be easily separated into a set of mono-colour images or sub-images. For example, an image I from an RGB image sensor 2 may be divided into a red mono-colour image $I^R$ which is an N by M array of the red intensity values $I_{n,m,R}$, a green mono-colour image $I^G$ which is an N by M array of the green intensity values $I_{n,m,G}$, and a blue mono-colour image $I^B$ which is an N by M array of the intensity values $I_{n,m,B}$.

The purpose of the system 1 is to determine whether or not the target analyte is present in the sample 3, and/or to determine a concentration of the target analyte. To this end, the sample 3 is arranged within the field-of-view 4 of the image sensor 2 and the image sensor 2 is used to acquire a sample image $I^S$ (or first image) which contains an image of the sample 3.

The sample image $I^S$ may be obtained and processed immediately, for example, using a single device which includes an image sensor 2 and data processing capabilities. Alternatively, the sample image $I^S$ may be obtained separately and in advance of applying the first or second methods described herein. For example, a number of sample images $I^S$ may be obtained as a batch for subsequently batch processing at a later time or in a different location. For example, one of more sample images $I^S$ may be obtained then uploaded or transmitted to a remote location for processing.

First and second mono-colour arrays $L^1$, $L^2$ are extracted from the sample image $I^S$ (or first image). The first and second mono-colour arrays $L^1$, $L^2$ correspond to different colour channels, for example the $k_1^{th}$ and $k_2^{th}$ of K colour channels where $k_1 \ne k_2$. Each mono-colour array $L^1$, $L^2$ includes a number, $N_e$, of entries. Each entry of the first and second mono-colour arrays $L^1$, $L^2$ is determined by aggregating one or more pixels $I^S_{n,m}$ of the sample image $I^S$. For example, each entry of the mono-colour arrays $L^1$, $L^2$ may correspond to a row of the sample image $I_S$, such that $N_e = N$ and:

$$L_n^k = \sum_{m=1}^{M} I^S_{n,m,k} \quad (1)$$

in which $L_n^k$ is the $n^{th}$ of N entries of a mono-colour array corresponding to the $k^{th}$ of K colour channels. Alternatively, each entry of the mono-colour arrays $L^1$, $L^2$ may correspond to a column of the sample image $I_S$ such that $N_e = M$.

Alternatively, each entry of the mono-colour arrays $L^1$, $L^2$ may correspond to a specific region of interest within the sample image $I^S$. Such a region of interest may be automatically determined or user determinable. A region of interest may be rectangular, for example, spanning rows na to nb and columns ma to mb such that:

$$L_i^k = \sum_{n=na}^{nb} \left( \sum_{m=ma}^{mb} I^S_{n,m,k} \right) \quad (2)$$

in which $L_i^k$ is the $i^{th}$ of $N_e$ entries of a mono-colour array corresponding to the $k^{th}$ of K colour channels, and in which the $i^{th}$ entry corresponds to a region of interest defined by $na \le n \le nb$ and $ma \le m \le mb$. In equations (1) and (2), aggregation is performed by summing pixel intensity values. However, aggregation may alternatively by performed by obtaining a mean, median or mode average of corresponding pixel values $I^S_{n,m,k}$ of the sample image $I^S$.

Another option is that each entry of the mono-colour arrays $L^1$, $L^2$ may correspond to a single pixel of the sample image $I^S$, in other words aggregating a single pixel so that $L^k_{n,m} = I^S_{n,m,k}$. In this latter case, the first and second mono-colour arrays $L^1$, $L^2$ are equivalent to first and second mono-colour images $I^1$, $I^2$. The first mono-colour image $I^1$ is an N by M array of the intensity values $I^1_{n,m} = I_{n,m,k}$ of one colour channel, for example the $k_1^{th}$ of K colour channels. The second mono-colour image $I^2$ is an N by M array of the intensity values $I^2_{n,m} = I_{n,m,l}$ of a second, different colour channel, for example the $k_2^{th}$ of K colour channels.

In principle, any pair of colour channels of the image sensor 2 may be used to provide the first and second mono-colour arrays $L^1$, $L^2$ (or mono-colour images $I^1$, $I^2$). In practice, one pairing of colour channels will be preferred for each analyte, depending on the colour associated with the analyte and the colour balance of illumination. According to the second method described hereinafter, more than two colour channels may be analysed.

For example, using an RGB image sensor 2 there are three possible pairings of colour channels, namely R and G, R and B or G and B. For a first analyte the optimal pairing might be R and G, whereas G and B might be the optimal pairing for a second analyte which is associated with a different colour than the first analyte.

Using the first and second mono-colour arrays $L^1$, $L^2$, a filtered array $L^F$ may be calculated in several ways. In a first calculation, the $i^{th}$ of $N_e$ entries $L^F_i$ of the filtered array $L^F$ may be calculated as a ratio of the corresponding entries $L^1_i$, $L^2_i$ of the first and second mono-colour arrays $L^1$, $L^2$, for example according to:

$$L_i^F = \frac{L_i^1}{L_i^2} \quad (3)$$

and in the special case that the first and second mono-colour arrays $L^1$, $L^2$ are first and second mono-colour images $I^1$, $I^2$, the filtered array $L^F$ is a filtered image $I^F$ calculated according to:

$$I_{n,m}^F = \frac{I_{n,m}^1}{I_{n,m}^2} \quad (3b)$$

Alternatively, in a second calculation, the $i^{th}$ of $N_e$ entries $L_i^F$ of the filtered array $L^F$ may be calculated as a difference of the corresponding entries $L_i^1$, $L_i^2$ of the first and second mono-colour arrays $L^1$, $L^2$, for example according to:

$$L_i^F = L_i^1 - L_i^2 \quad (4)$$

and in the special case that the first and second mono-colour arrays $L^1$, $L^2$ are first and second mono-colour images $I^1$, $I^2$, the filtered array $L^F$ is a filtered image $I^F$ calculated according to:

$$I_{n,m}^F = I_{n,m}^1 - I_{n,m}^2 \quad (4b)$$

In some examples the filtered array $L^F$ calculated as a difference may be calculated as a weighted difference of the corresponding entries $L_i^1$, $L_i^2$ of the first and second mono-colour arrays $L^1$, $L^2$, for example according to:

$$L_i^F = \frac{L_i^1 - L_i^2}{L_i^1 + L_i^2} \quad (5)$$

and in the special case that the first and second mono-colour arrays $L^1$, $L^2$ are first and second mono-colour images $I^1$, $I^2$, the filtered array $L^F$ is a filtered image $I^F$ calculated according to:

$$I_{n,m}^F = \frac{I_{n,m}^1 - I_{n,m}^2}{I_{n,m}^1 + I_{n,m}^2} \quad (5b)$$

Image sensors 2 integrated into cameras typically output images in processed file formats. Commonly used file formats include joint photographic experts group (".jpeg"), bitmap (".bmp"), tagged image file format (".tiff") and so forth. The methods of the present specification may be carried out on any such processed file formats which retain colour information. Equally, the methods of the present specification may be carried out on raw image data files (no standardised filename extension is in use) output by the image sensor 2. Raw image data files may provide superior signal-to-noise ratio when compared to processed file formats, since compressed file formats can sometimes introduce additional noise (compression artefacts) into the image data.

The presence or concentration of a target analyte in the sample 3 may be determined based on the filtered array $L^F$ or filtered image $I^F$. As shall be explained hereinafter, in the filtered array $L^F$ or image $I^F$, the influence of noise resulting from background inhomogeneity of the sample 3 may be substantially reduced. This may permit detection of the presence of a target analyte at a lower concentration, since smaller signals may be clearly distinguished above the reduced background noise. The precision of quantitative estimates of the target analyte concentration may also be improved as a result of the reduced noise in the filtered array $L^F$ or image $I^F$.

Lateral flow test devices (also known as "lateral flow test strips" or "lateral flow immunoassays") are a variety of biological testing kit. Lateral flow test devices may be used to test a liquid sample, such as saliva, blood or urine, for the presence of a target analyte. Examples of lateral flow devices include home pregnancy tests, home ovulation tests, tests for other hormones, tests for specific pathogens and tests for specific drugs.

Figure 8:
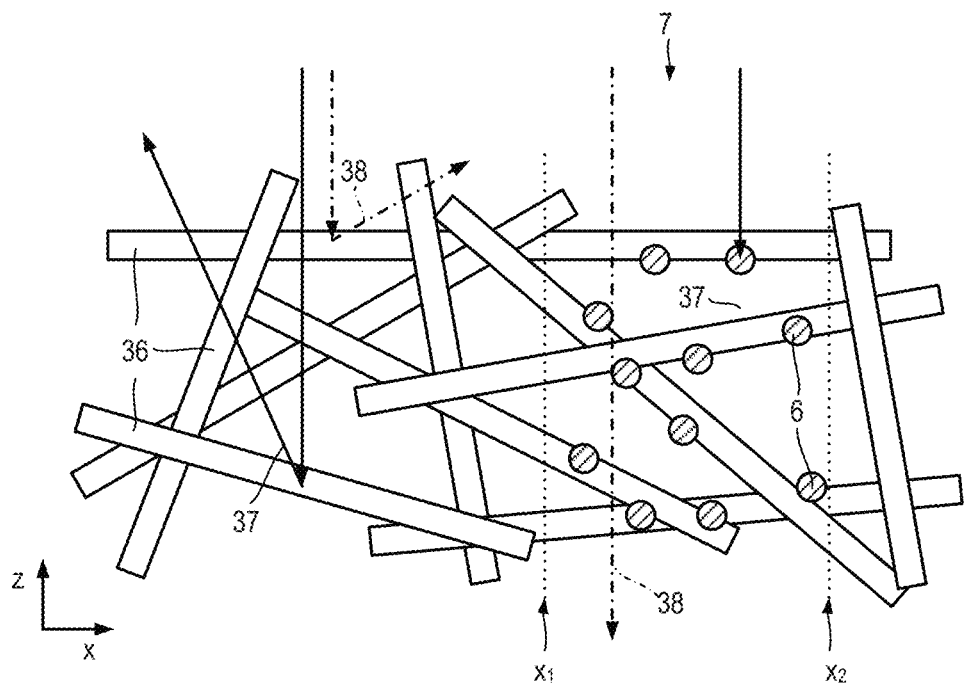

In a typical lateral flow test strip, a liquid sample is introduced at one end of a porous strip 5 and the liquid sample is then drawn along the porous strip 5 by capillary action (or "wicking"). One or more portions of the porous strip 5 are pre-treated with labelling particles 6 (FIG. 8) which are activated with a reagent which binds to the target analyte to form a complex if the target analyte is present in the liquid sample. The bound complexes and any unreacted labelling particles 6 (FIG. 8) continue to propagate along the porous strip 5 before reaching a testing region 7 which is pre-treated with an immobilised binding reagent that binds complexes of analyte bound to labelling particles 6 (FIG. 8) and does not bind unreacted labelling particles 6 (FIG. 8). The labelling particles 6 (FIG. 8) have a distinctive colour, or otherwise absorb or fluoresce in response to one or more ranges of ultraviolet (UV), visible (VIS) or near infrared (NIR) light. The development of a concentration of labelling particles 6 (FIG. 8) in the test region 7 may be measured and quantified through colorimetric analysis, for example to measure the concentration of labelling particles 6 (FIG. 8). The porous strip 5 may also include a control region 8 which is treated with an immobilised binding reagent that binds unreacted labelling particle 6. One or more testing regions 7 of a lateral flow test strip may be used as regions of interest corresponding to entries of the first and second mono-colour arrays $L^1$, $L^2$.

Colorimetric analysis may be performed on developed lateral flow tests, i.e. a liquid sample has been left for a pre-set period to be drawn along the porous strip 5. Additionally or alternatively, colorimetric analysis may be employed to perform kinetic (i.e. dynamic) time resolved measurements of the optical density of labelling particles 6 (FIG. 8) in the test region 7 of a lateral flow test.

A user must interpret the results of a lateral flow test by judging whether the test region 7 exhibits a change in colour, or by comparing a colour change of the test region 7 against one or more shades or colours of a reference chart provided with the test. It can be difficult for an inexperienced user to read the test results. Consequently, there has been interest in providing tools which can automatically read and/or quantify the results of lateral flow test devices (along with other types of colorimetric assays). The present specification is not directly concerned with any one method of performing a qualitative or quantitative colorimetric analysis. Instead, the methods of the present specification are concerned with improving the signal-to-noise ratio of methods of colorimetric analysis which involve obtaining and analysing images of a sample 3. This is possible because calculating the filtered array $L^F$ or image $I^F$ as described hereinbefore may reduce or remove the effects of background inhomogeneity of the sample 3.

The porous strip 5 is commonly made from nitrocellulose or paper (cellulose) fibres. Consequently, the porous strip 5 is non-homogenous, and this can give rise to variations in the background reflectance/transmittance of the porous strip 5. Such background inhomogeneity is superposed with the signal from the labelling particles 6 (FIG. 8), and acts as a source of noise in colorimetric analysis of lateral flow devices. The pattern of background inhomogeneity is typically random and thus different for each porous strip 5.

The methods of the present specification may improve the accuracy and precision of colorimetric analysis by filtering out background inhomogeneity of a sample. As explained further in relation to FIG. 8, this is because background inhomogeneity of a sample is often largely independent of wavelength, whereas the absorbance of the labelling particles 6 used for colorimetric testing typically shows considerable variation with wavelength.

The methods of the present specification may be used when the sample 3 is illuminated by ambient light, i.e. natural daylight or regular room lighting. A separate, dedicated light source is not required. However, in some examples, ambient lighting may be augmented using a light source 9 arranged to illuminate the sample 3.

In other examples, the sample 3 may be illuminated using a light source 9 whilst the sample 3 and image sensor 2 are screened from ambient light. For example, the sample 3, image sensor 2 and light source 9 may be sealed in a room or a container to reduce or even entirely block out ambient light. Screening of ambient light may be preferred for fluorescence measurements.

The light source 9 may be a broadband light source, i.e. a white light source such as a tungsten-halogen bulb. A broadband light source need not be a thermal source, and alternative broadband light sources include a white light emitting diode (LED), a mercury fluorescent lamp, a high pressure sodium lamp and so forth.

Alternatively, the light source 9 may include several different types of light emitter. For example, the light source 9 may be an array of LEDs having different colour emission profiles.

Some analytes may fluoresce under ultraviolet light, or may be labelled using reagents and/or particles which fluoresce under ultraviolet light. For such analytes, the light source 9 may be an ultraviolet lamp. The fluorescence may not be visible under bright ambient illumination, in which case it may be preferable to screen the sample 3 and image sensor 2 from ambient light.

In general, there is no need for the sample 3 and the image sensor 2 to be held in a fixed or repeatable relative orientation. However, in some examples it may be useful to arrange the sample 3 within a sample holder (not shown) which has a fixed geometric relationship with the image sensor 2. For example, the sample holder (not shown) may take the form of a frame or scaffold to, or within, which the image sensor 2 and sample 3 may be secured. When a light source 9 is used, the sample holder (not shown) may secure the sample 3 in a fixed geometric relationship with the image sensor 2 and the light source 9.

As shown in FIG. 1, the image sensor 2 may be used to obtain sample images $I^S$ using light reflected from the sample 3.

Figure 2:
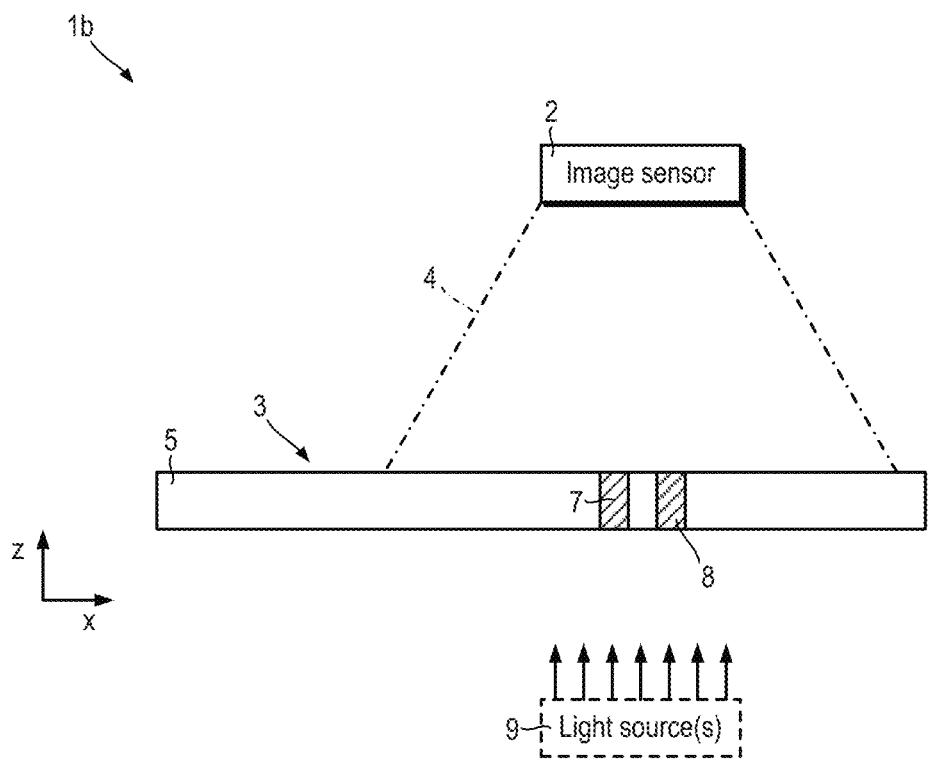
FIG. 2 illustrates a system for colorimetric analysis using transmitted light.

Referring also to FIG. 2, an alternative system for colorimetric analysis 1b is shown.

The methods of the present specification are not limited to reflected light, and may also be used when the image sensor 2 is used to obtain sample images $I^S$ using light transmitted through the sample 3. A transmitted light image may be obtained by holding the sample 3 up against an ambient light source such as the sun, a window or a light bulb. More conveniently, a transmitted light image may be obtained by arranging the sample 3 between a light source 9 and the image sensor 2.

Referring also to FIG. 3, an example of a first lateral flow device 10 suitable for measurements using reflected light is shown.

A brief summary of the operation of lateral flow devices may be helpful, in so far as it is relevant to understanding the background of the invention. However details of the specific chemistries used to test for particular analytes are not relevant to understanding the present invention and are omitted.

The first lateral flow device 10 includes a porous strip 5 divided into a sample receiving portion 11, a conjugate portion 12, a test portion 13 and a wick portion 14. The porous strip 5 is in contact with a substrate 15, and both are received into a base 16. The substrate 9 may be attached to the base 16. In some examples the substrate 9 may be omitted. A lid 17 is attached to the base 16 to secure the porous strip 5 and cover parts of the porous strip 5 which do not require exposure. The lid 17 includes a sample receiving window 18 which exposes part of the sample receiving portion 11 to define a sample receiving region 19. The lid 17 also includes a result viewing window 20 which exposes the part of the test portion 13 which includes the test region 7 and control region 8. The lid and base 16, 17 are made from a polymer such as, for example, polycarbonate, polystyrene, polypropylene or similar materials.

A liquid sample 21 is introduced to the sample receiving portion 19 through the sample receiving window 18 using, for example, a dropper 22 or similar implement. The liquid sample 21 is transported along from a first end 23 towards a second end 24 by a capillary, or wicking, action of the porosity of the porous strip 11, 12, 13, 14. The sample receiving portion 11 of the porous strip 5 is typically made from fibrous cellulose filter material.

The conjugate portion 12 has been pre-treated with at least one particulate labelled binding reagent for binding a target analyte to form a labelled-particle-analyte complex. A particulate labelled binding reagent is typically, for example, a nanometre or micrometre sized labelling particle 6 (FIG. 8) which has been sensitised to specifically bind to the analyte. The labelling particles 6 (FIG. 8) provide a detectable response, which is usually a visible optical response such as a particular colour, but may take other forms. For example, particles may be used which are visible in infrared or which fluoresce under ultraviolet light. Typically, the conjugate portion 12 will be treated with one type of particulate labelled binding reagent to test for the presence of one type of analyte in the liquid sample 21. However, lateral flow devices 10 may be produced which test for two or more analytes using two or more varieties of particulate labelled binding reagent concurrently. The conjugate portion 12 is typically made from fibrous glass, cellulose or surface modified polyester materials.

As the liquid sample 21 flows into the test portion 13, labelled-particle-analyte complexes and unbound label particles are carried along towards the second end 24. The test portion 13 includes one or more test regions 7 and control regions 8 which are exposed by the result viewing window 20 of the lid 17. A test region 7 is pre-treated with an immobilised binding reagent which specifically binds the label particle-target complex and which does not bind the unreacted label particles. As the labelled-particle-analyte complexes are bound in the test region 43, the concentration of the labelling particles 6 (FIG. 8) in the test region 7 increases. The concentration increase causes the colour or other indicator of the labelling particles 6 (FIG. 8) to become observable. If the test region 7 changes colour (or changes colour within a prescribed period), then the test for the presence of the analyte is positive. If the analyte is not present in the liquid sample 21, then the test region 7 does not change colour (or does not change colour within a prescribed duration) and the test is negative. Alternatively, if the label particles emit a detectable signal, for example by fluorescence, then the detected emission increases as the concentration of labelling particles bound in the test region 7 increases.

To provide distinction between a negative test and a test which has simply not functioned correctly, a control region 8 is often provided between the test region 7 and the second end 24. The control region 8 is pre-treated with a second immobilised binding reagent which specifically binds unreacted labelling particles 6 (FIG. 8) and which does not bind the labelled-particle-analyte complexes. In this way, if the test has functioned correctly and the liquid sample 21 has passed through the conjugate portion 12 and test portion 13, the control region 8 will change colour.

The test portion 13 is typically made from fibrous nitrocellulose, polyvinylidene fluoride, polyethersulfone (PES) or charge modified nylon materials. Regardless of the specific material used, the fibrous nature of the test portion results in background inhomogeneities which register in the measured reflectance and transmittance of the test portion 13. The method described hereinbefore in relation to equations (1) and (2) can help to improve signal-to-noise ratio by reducing or removing the effects of such background inhomogeneities. Alternatively, more than two colour channels may be used to generate a filtered image using the second method explained hereinafter.

The wick portion 14 provided proximate to the second end 24 soaks up liquid sample 21 which has passed through the test portion 13 and helps to maintain through-flow of the liquid sample 21. The wick portion 14 is typically made from fibrous cellulose filter material.

Referring also to FIG. 4, an example of a second lateral flow device 25 suitable for measurements using transmitted light is shown.

The second lateral flow device 25 is the same as the first lateral flow device 10, except that the second lateral flow device 25 further includes a second result viewing window 26. The second result viewing window 26 is provided through the base 16 and is arranged opposite to the result viewing window 20. In the second lateral flow device 25, the substrate 15 is transparent or translucent, and allows light to be transmitted through the test region 7 and control region 8 of the test portion 13 for imaging via the result viewing window 20.

Figures 5A, 5B, 5C, 5D, 6:
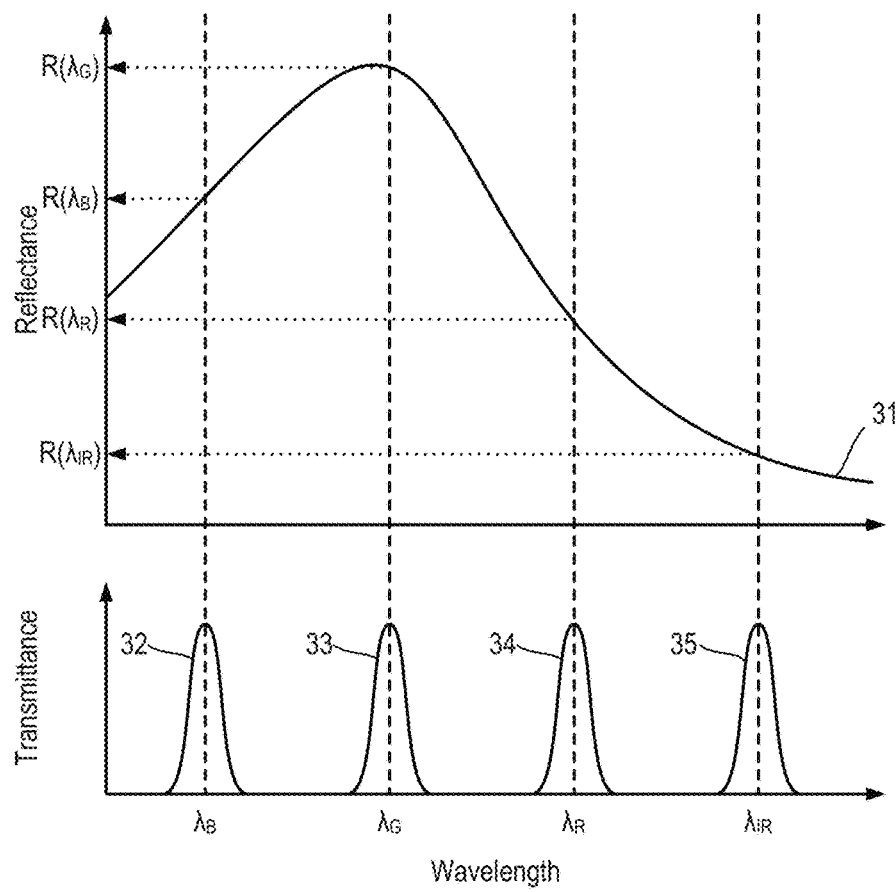
FIGS. 5A to 5D illustrate filter mosaics for use in an image sensor.
FIG. 6 illustrated detection of a colour using an image sensor having red, green and blue colour channels.

Referring to FIG. 5A, a first filter mosaic 27 for an image sensor 2 is shown.

As discussed hereinbefore, an image sensor 2 having multiple different colour channels may be provided using a filter mosaic 27 overlying an array of light sensors. Each such light sensor is sensitive to the wavelengths of light which are transmitted by the overlying filter. The first filter mosaic is a Bayer filter (or RGBG filter) for a red-green-blue, or RGB image sensor 2. Only four repeating units of the first filter mosaic are shown in FIG. 5A. RGB image sensors 2 are the most commonly employed image sensors 2 used in digital cameras, smart phones and so forth. Alternative mosaics of R, G and B filters may be used.

Referring also to FIG. 5B, a second filter mosaic 28 for an image sensor 2 is shown.

Although RGB image sensors 2 are commonly employed, other types of image sensors 2 are possible which use alternative colour channels. For example, the alternative cyan (C), yellow (Y), magenta (M) colour scheme may be used instead of an RGB colour scheme. The second filter mosaic 28 is a CYYM filter mosaic for a CYM image sensor 2.

Referring also to FIG. 5C, a third filter mosaic 29 for an image sensor 2 is shown.

Image sensors 2 are not restricted to only three colour channels, and a greater number of colour channels may be included. The third filter mosaic 29 includes R, G and B filters, and additionally includes infrared (IR) filters. An infrared colour channel for an image sensor will typically transmit near infrared (NIR) light. Including a colour channel for IR/NIR can be useful for the methods of the present specification. In particular, materials which are different (visible) colours may often have very similar reflectance/transmittance at IR/NIR wavelengths. The third mosaic filter 29 is an RGBIR mosaic filter for an RGBIR image sensor 2.

Referring also to FIG. 5d, a fourth filter mosaic 30 for an image sensor 2 is shown.

Image sensors 2 are not restricted to three visible colour channels. Some image sensors 2 may use filter mosaics which combine four different visible colour channels, for example, the fourth filter mosaic 30 is a CYGM filter mosaic for a CYGM image sensor 2.

An image sensor 2 may include non-visible colour channels other than IR/NIR, for example an image sensor 2 may include an ultraviolet colour channel.

In principle, any number of colour channels may be included on an image sensor. In practice, there are limits on the minimum size of light sensors making up the array of an image sensor 2. Consequently, if large numbers of different colour channels were included, the minimum repeat size of the filter mosaic would become large and the offset between images corresponding to each colour channel may become unacceptable. In practice, only three visible colour channels are required to produce colour images.

Referring also to FIG. 6, detection of a colour by an RGBIR image sensor 2 is illustrated.

The reflectance profile 31 associated with an analyte may peak at or close to a typical wavelength of green light $\lambda_G$. For example, the reflectance profile 31 may take the value $R(\lambda_G)$ at a typical wavelength of green light $\lambda_G$. Similarly, the reflectance profile 31 may take values $R(\lambda_B)$, $R(\lambda_R)$ and $R(\lambda_{IR})$ at typical wavelengths of blue, red and infrared light $\lambda_B$, $\lambda_R$ and $\lambda_{IR}$ respectively.

A filter mosaic such as the third filter mosaic 29 includes R, G, B and IR filters having respective filter transmittance profiles 32, 33, 34, 35. Each filter transmittance profile 32, 33, 34, 35 transmits a range of wavelengths about the corresponding wavelength $\lambda_B$, $\lambda_G$, $\lambda_R$, $\lambda_{IR}$.

Since the reflectance profile 31 associated with an analyte may vary considerably with wavelength, the intensity recorded by the image sensor 2 and which is associated with the analyte will vary between the different mono-colour images $I^k_{n,m}$. In contrast to this, background inhomogeneity of a sample 3 may vary much less with wavelength. For example, varying density the of fibrous materials used for the porous strip 5 of a lateral flow testing device may lead to irregular variations in the amount of reflected/transmitted light, but such variations do not have a strong dependence on wavelength. Consequently, comparing measured intensity values from a pair of different colour channels can allow the signal resulting from background inhomogeneity to be reduced or removed.

Figure 7:
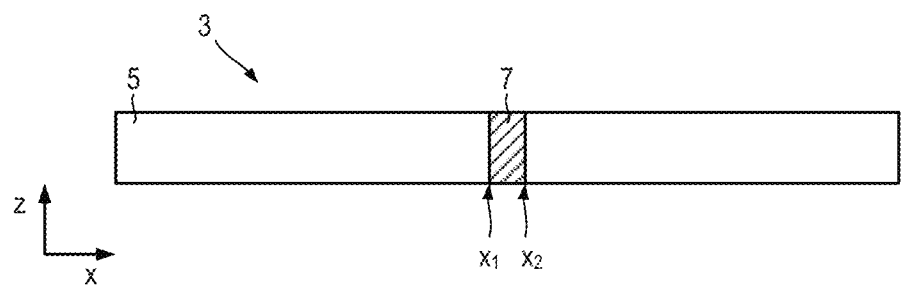
FIGS. 7 and 8 illustrate the structure of a porous strip for lateral flow devices shown in FIGS. 3 and 4.

Referring also to FIGS. 7 and 8, the structure of a porous strip 5 is schematically illustrated.

Referring in particular to FIG. 7, a test region 7 lies between first and second positions $x_1$, $x_2$ in a direction x along the length of the porous strip 5.

Referring in particular to FIG. 8, the porous strip 5 is typically fibrous, for example, formed from a mat of fibres 36 such as nitrocellulose fibres. Within the test region 7, the immobilised binding reagent binds complexes of analyte and labelling particles 6.

The fibres 36 may scatter and/or absorb light across a broad range of wavelengths in an approximately similar way. This is the case for white fibres 36 providing a substantially white porous strip 5. Strongly coloured fibres 36 are, in general, not preferred for lateral flow devices, since this would tend to amplify the existing challenges of reading and/or quantifying the test results. For example, the proportion of green light 37 which is scattered by fibres 36 is approximately the same as the proportion of red light 38 scattered by the fibres 36. However, the fibrous porous strip 5 is not uniform, and the density of fibres 36 may vary from point to point along the porous strip 5. Such background variations of scattering/absorbance due to the inhomogeneity of the porous strip 5 may limit the sensitivity of a measurement, i.e. the minimum detectable concentration of labelling particles 6.

By contrast, within the test region 7, the absorbance or scattering by the labelling particle 6 may be substantially different between green light 37 and red light 38. For example, if the reflectance 31 of the labelling particles 5 is similar to that shown in FIG. 6.

Referring also to FIGS. 9 to 13, a schematic example of applying the first method is illustrated.

The schematic examples shown in FIGS. 9 to 13 are based on the schematic reflectance profile 31 shown in FIG. 6.

Figure 9:
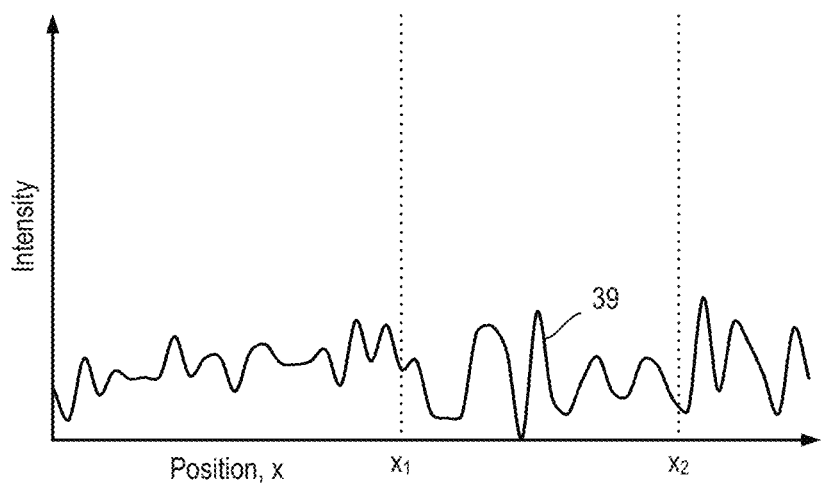
FIG. 9 illustrates a background profile of reflectance from a blank porous strip.

Referring in particular to FIG. 9, the background profile 39 of reflected intensity as a function of position x along a porous strip shows variability which arises from the inhomogeneity of the porous strip 5. When rows of the sample image $I^S$ are aligned parallel to the position direction x, the background profile 39 corresponds to summing pixel intensity values in each column of the sample image $I^S$ (and vice versa for rows and columns). The background profile 39 corresponds to no labelling particles 6 within the test region 7, $x_1$ to $x_2$. For large concentrations of labelling particles 6, the peak-to-peak fluctuations of the background profile 39 will not prevent detection. However, at low concentrations of labelling particles 6, the peak-to-peak fluctuations of the background profile 39 will prevent reliable detection.

Figure 10:
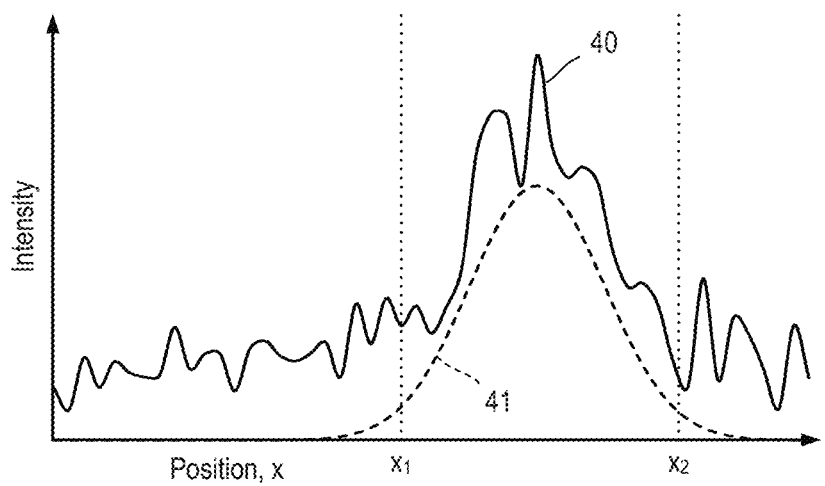
FIGS. 10, 11 and 12 illustrate profiles of reflected intensity observed by green, blue and red colour channels respectively.

Referring in particular to FIG. 10, the reflected green intensity 40 is shown when a concentration of labelling particles 6 is bound within the test region 7 substantially between positions $x_1$ to $x_2$. When rows of the sample image $I^S$ are aligned parallel to the position direction x, the reflected green intensity 40 corresponds to a green mono-colour array $L^G$, the entries of which are determined by summing pixel intensity values in each column of the sample image $I^S$ (and vice versa for rows and columns). The reflected green intensity 40 includes a contribution from the background profile 39 in addition to the reflections 41 arising from the concentration of the labelling particles 6 within the test region 7 substantially between positions $x_1$ to $x_2$.

Figure 11:
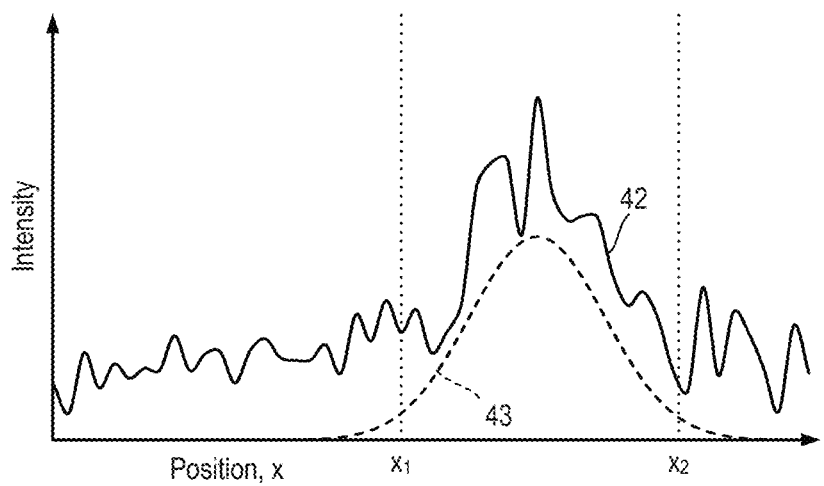

Referring in particular to FIG. 11, the reflected blue intensity 42 includes a contribution from the background profile 39 in addition to the reflections 43 arising from the concentration of the labelling particles 6 within the test region 7, $x_1$ to $x_2$. When rows of the sample image $I^S$ are aligned parallel to the position direction x, the reflected blue intensity 42 corresponds to a blue mono-colour array $L^B$, the entries of which are determined by summing pixel intensity values in each column of the sample image $I^S$ (and vice versa for rows and columns).

Figure 12:
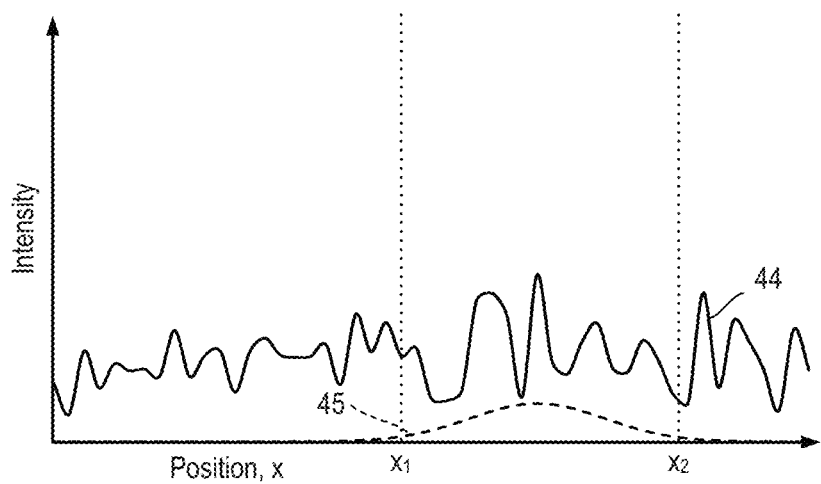

Referring in particular to FIG. 12, the reflected red intensity 44 includes a contribution from the background profile 39 in addition to the reflections 45 arising from the concentration of the labelling particles 6 within the test region 7, $x_1$ to $x_2$. When rows of the sample image $I^S$ are aligned parallel to the position direction x, the reflected red intensity 44 corresponds to a red mono-colour array $L^R$, the entries of which are determined by summing pixel intensity values in each column of the sample image $I^S$ (and vice versa for rows and columns).

Figure 13:
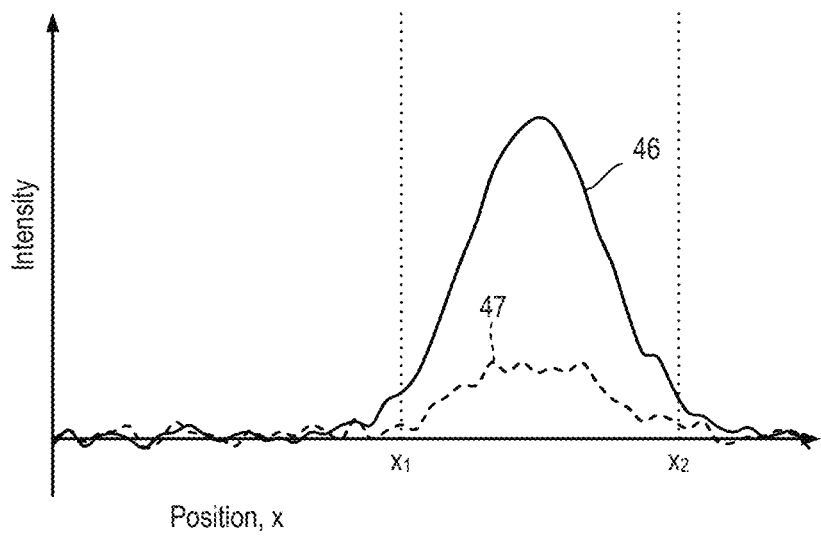
FIG. 13 illustrates combining intensity profiles from pairs of colour channels to compensate for the background profile shown in FIG. 9.

Referring now to FIG. 13, the method of equation (4) may be applied to the difference of the green intensity 40 and the red intensity 44 to produce an G-R filtered profile 46. When rows of the sample image $I^S$ are aligned parallel to the position direction x, the G-R filtered profile 46 corresponds to a filtered array $L^F$. In this way, the influence of the background profile 39 may be reduced or removed. In practice, the R-G filtered profile 46 (i.e. the filtered array $L^F$) will retain noise from other sources which, unlike the background profile 39, is not correlated between the green intensity 40 and the red intensity 44. Additionally, the background profile 39 may have some wavelength dependence in practice. The method of equation (4) may also be applied to the difference of the green intensity 40 and the blue intensity 42. However, since the difference in the reflectance profile 31, i.e. $R(\lambda_G)-R(\lambda_B)$, for G-B is less than for G-R, the resulting G-B filtered profile 47, which is another example of a filtered array $L^F$, has a smaller amplitude than the G-R filtered profile 46, so that the improvement in signal to noise ratio is less pronounced.

In general, any pair of channels may be selected as the first and second mono-colour arrays $L^1$, $L^2$ or images $I^1$, $I^2$ to permit reduction or removal of the background profile 39. However, in order to maximise the resultant signal due to an analyte, the pair of colour channels selected to provide the first and second mono-colour arrays $L^1$, $L^2$ or images $I^1$, $I^2$ should preferably be chosen according to the largest difference between the transmittance profile 31 of the analyte and/or associated labelling particles 6.

Although the example described with reference to FIGS. 6 to 13 refers to images obtained in a reflection geometry, the same principles apply to a transmission geometry, with substitution of the reflectance profile 31 of the analyte for the transmittance profile (not shown). Both the transmittance and reflectance depend upon the absorbance of the analyte or the associated labelling particles 6.

In this way, the signal-to-noise ratio of a signal associated with an analyte may be improved in a filtered array $L^F$ or image $I^F$, whether the sample image $I^S$ (first image) is obtained in transmission or reflection.

Figure 14:
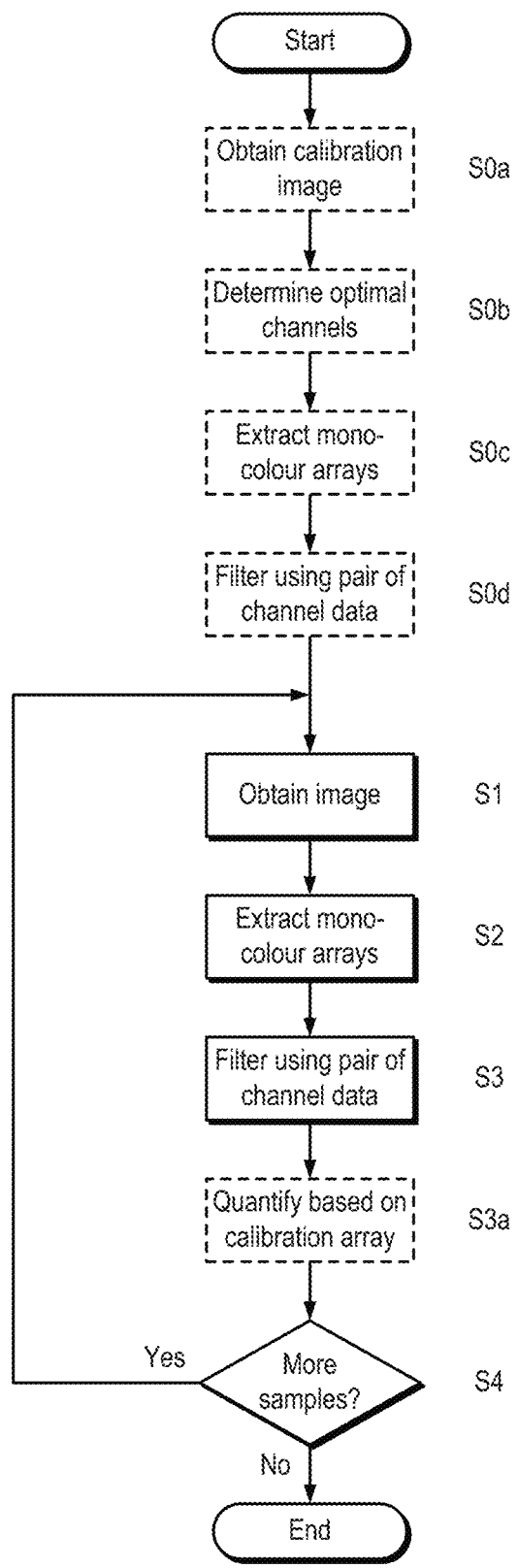
FIG. 14 is a process flow diagram of a first method of obtaining a filtered image.

Referring to FIG. 14, a process flow diagram of the first method of determining the presence or concentration of an analyte in a sample 3 is shown.

Referring again to FIGS. 1 and 2, the method is conducted using an image sensor 2 having two or more colour channels. Each pixel $I_{n,m}$ of each image comprises a set of intensity values $I_{n,m}=(I_{n,m,1}, \ldots, I_{n,m,k}, \ldots, I_{n,m,K})$ corresponding to each of the different colour channels.

The image sensor 2 is used to obtain a sample image $I^S$, or first image, of the sample 3 which may comprise a target analyte (step S1). The target analyte has an associated colour. The associated colour may be inherent to the target analyte. Alternatively, the associated colour may be provided by a reagent which is reacted with the target analyte in advance of obtaining the sample image $I^S$. The associated colour may be provided by labelling particles 6 which have been bound to the target analyte. If desired, the sample 3 may be secured in a sample holder having a fixed geometric relationship with the image sensor 2 before obtaining the sample image $I^S$.

The first and second mono-colour arrays $L^1$, $L^2$ or images $I^1$, $I^2$ are extracted from the sample image $I^S$ (step S2). For example, mono-colour arrays $L^1$, $L^2$ may be calculated in accordance with equations (1) or (2). In another example using an RGB image sensor 2 having pixels $I_{n,m}=(I_{n,m,R}, I_{n,m,G}, I_{n,m,B})$, if the green and red colour channels are to be used, a first mono-colour image $I^1$ may have pixel values $I^1_{n,m}=I_{n,m,R}$, and a second mono-colour image $I^2$ may have pixel values $I^2_{n,m}=I_{n,m,G}$.

The filtered array $L^F$ or image $I^F$ or second image is calculated based on the first and second mono-colour arrays $L^1$, $L^2$ or images $I^1$, $I^2$ respectively (step S3). Each entry of the filtered array $L^F_i$ may be calculated as a ratio of the corresponding entries $L^1_i$, $L^2_i$ of the first and second mono-colour arrays $L^1$, $L^2$ according to equation (3). When mono-colour images $I^1$, $I^2$ are used, each pixel of the filtered image $I^F_{n,m}$ may be calculated as a ratio of the corresponding pixel values $I^1_{n,m}$, $I^2_{n,m}$ of the first and second mono-colour images $I^1$, $I^2$ according to equation (3b). Alternatively, each entry of the filtered array $L^F_i$ may be calculated as a difference of the corresponding entries $L^1_i$, $L^2_i$ of the first and second mono-colour arrays $L^1$, $L^2$ according to equation (4). When mono-colour images $I^1$, $I^2$ are used, each pixel of the filtered image $I^F_{n,m}$ may be calculated as a difference of the corresponding pixel values $I^1_{n,m}$, $I^2_{n,m}$ of the first and second mono-colour images $I^1$, $I^2$ according to equation (4b). The difference may be a weighted difference according to equations (5) or (5b) respectively.

If further samples 3 (or different regions of the same sample 3) require analysis (step S4, Yes), then such further samples 3 may be arranged to permit obtaining further sample images $I^S$ using the image sensor (step S1).

The steps S1 to S4 provide a qualitative colorimetric analysis in which the limit of detection, i.e. the minimum detectable concentration of analyte, of the filtered array $L^F$ or image $I^F$ may be improved by the reduction or removal of signals resulting from background inhomogeneity of the sample 3.

If a quantitative analysis is required, comparison is usually made with a reference or standard calibration sample which corresponds to a known concentration of the analyte. This requires additional steps compared to a qualitative analysis.

Figure 15:
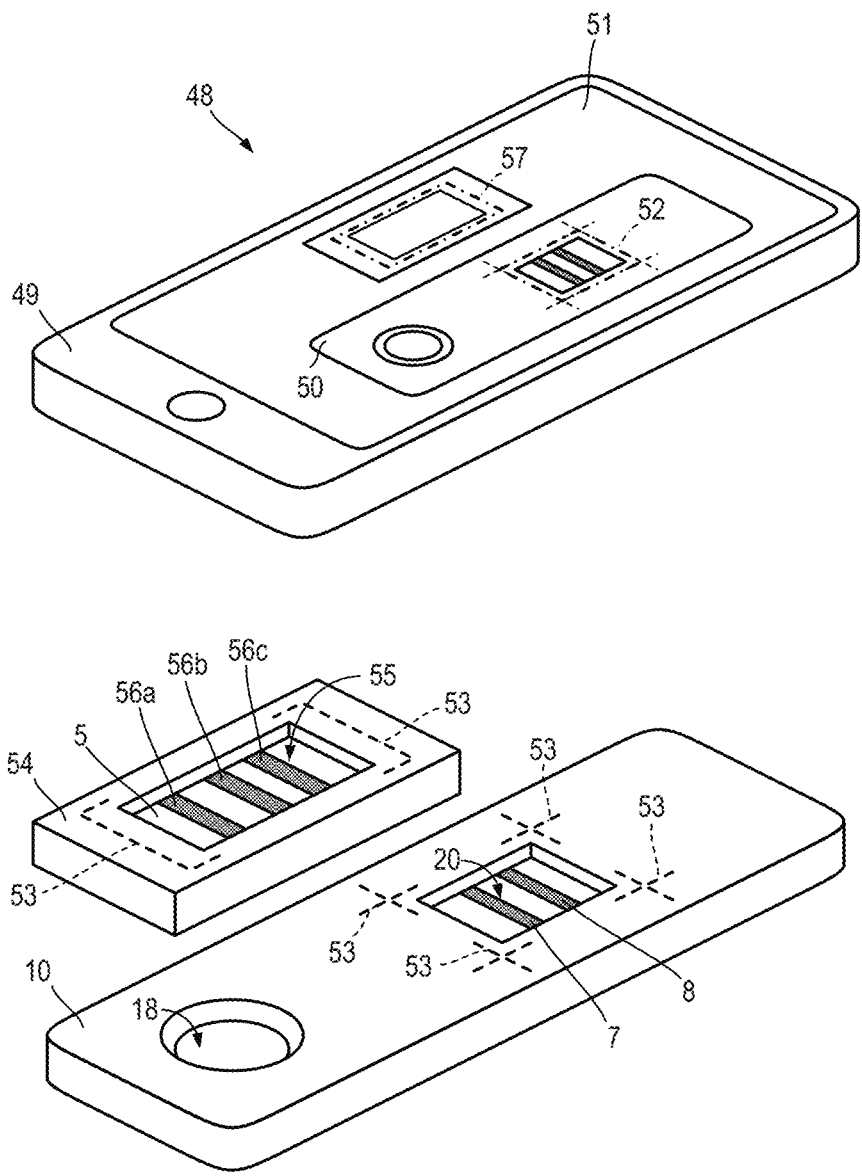
FIG. 15 illustrates a system for colorimetric analysis using a mobile device.

Referring also to FIG. 15, the concentration of an analyte present in the sample 3 may be determined by comparing the filtered array $L^F$ or image $I^F$ with a calibration array J corresponding to a calibration sample 54 (step S3a). The calibration sample 54 may, in general, include one or more calibration regions 56. Each calibration region 56 corresponds to a different reference concentration of the analyte. The calibration array J includes a number $N_c$ of entries $J_d$, being the $d^{th}$ of $N_c$ entries. Each entry $J_d$ of the calibration array J corresponds to the reference concentration of a corresponding calibration region 56. The calibration sample 54 may be the same as the sample 3, for example, both the sample 3 and calibration sample 54 could be porous strips 5. The difference being that a concentration of the calibration sample 54 is known. Alternatively, the calibration sample 54 may comprise a substrate having a region or area which has been printed or coloured so as to correspond to the same colour and shade as a reference concentration of the analyte.

The calibration array J should have been generated according to a similar method and in comparable conditions to the filtered array $L^F$ or image $I^F$ in order to permit direct comparisons. Otherwise, the relative intensities in the filtered array $L^F$ or image $I^F$ cannot be meaningfully compared to those of the calibration array J. The concentration of analyte corresponding to an entry $L^F_i$ or pixel $I^F_{n,m}$ is determined by comparing the entry $L^F_i$ or pixel $I^F_{n,m}$ value against one or more entries $J_d$ of the calibration array. In general, the calibration array J only needs a single entry and the number of entries $N_c$ in the calibration array J need not equal the number of entries of in the filtered array $L^F$.

For example, the concentration corresponding to an entry $L^F_i$ may be obtained based on a ratio of the entry $L^F_i$ and a single entry $J_d$ of the calibration array J. When $N_c>1$, such a ratio may be obtained based on the entry $J_d$ which is closest in value to the entry $L^F_i$. Alternatively, the concentration corresponding to an entry $L^F_i$ may be interpolated based on a pair of entries $J_{d1}$, $J_{d2}$ which bracket the entry $L^F_i$.

A method of generating the calibration array J is explained with reference to steps Soa to Sod shown in FIG. 14.

The image sensor 2 is used to obtain a calibration image $I^C$, or second image, containing an image of the calibration sample 54 (step Soa).

Optionally, the optimal pair of colour channels for use in the prevailing illumination conditions (step Sob). For example, with an RGB image sensor 2, filtered images corresponding to at least each calibration region 56 may be determined using the first method and all possible pairs of colour channels, i.e. RG, RB or GB. Such filtered images $I^F$ may be analysed to determine relative improvements in signal-to-noise ratio for each, and the pair provided the largest improvement may be selected as the optimal choice for use in the prevailing illumination conditions. The selected pair of colour channels may be used for determining both the calibration array J and the filtered array $L^F$ or filtered image $I^F$ of the sample 3.

In this way, differences in the colour balance of ambient illumination between different time and at different locations may be taken into account and the pair of colour channels used for filtering may be selected to provide the optimal signal-to-noise ratio of a signal corresponding to the analyte. In other examples, the pair of colour channels to be used may be predetermined.

First and second mono-colour calibration arrays $Lc^1$, $Lc^2$ are extracted from the calibration image $I^C$ (step Soc). This process is the same way as extracting the mono-colour arrays $L^1$, $L^2$ from the sample image $I^S$, except that each entry of the mono-colour calibration arrays $Lc^1$, $Lc^2$ is determined by aggregating the pixels of the calibration image $I^C$ corresponding to one of the calibration regions 56.

The entries $J_d$ of the calibration array J are calculated based on the first and second mono-colour calibration arrays $Lc^1$, $Lc^2$ by analogy to whichever of equations (3), (4) or (5) will be/has been used to determine the filtered array $L^F$ or image $I^F$ (step Sod).

In examples where the sample 3 is secured in a sample holder (not shown) having a fixed geometric relationship with the image sensor 2, a calibration image $I^C$ may be obtained using a calibration sample 54 and the calibration array J calculated immediately prior to obtaining sample images $I^S$ of one or more samples 3 which may contain the analyte. The sample holder (not shown) may permit the calibration sample 54 to be imaged in the same relative location as samples 3 to be tested. In-situ calibration allows for variations in ambient illumination to be accounted for. When ambient illumination is used alone or in combination with a light source 9, it is preferable that the calibration image $I^C$ be obtained at the same or a proximate location and immediately prior to obtaining sample images $I^S$ of a set of samples 3, in order to ensure that illumination conditions are comparable. Alternatively, the calibration image $I^C$ may be obtained at the same or a proximate location and immediately after obtaining sample images $I^S$ of a set of samples 3. In this latter case, the processing of sample images $I^S$ containing the sample 3 or samples 3 may be deferred to allow batch processing based on comparisons against the calibration image $I^C$.

When ambient illumination is screened from the image sensor 2 and the sample 3 or calibration sample 54 and illumination is provided only a light source 9, the reproducible illumination conditions may permit the calibration array J to be determined in advance and stored in a storage device or storage location (not shown). When required for quantification of filtered arrays $L^F$ or images $I^F$, the calibration array J may be retrieved from the storage device or storage location.

Using a pair of colour channels provides a simple method to improve the signal-to-noise ratio for samples 3 which may contain a single analyte/marker. When a sample 3 or a liquid sample is coloured (e.g. blood or urine), or when more than one analyte may be present in the sample 3, a second method utilising more than two colour channels and described hereinafter may exhibit further performance improvements over the first method.

Application of the Method to Colorimetric Analysis Using a Mobile Device

Referring in particular to FIG. 15, a system 48 for colorimetric analysis using a mobile device is shown.

A mobile device 49, for example a smartphone, includes a camera having an image sensor 2 (FIG. 1). The image sensor 2 (FIG. 1) may be an RGB image sensor, a CYM image sensor 2, an RGBIR image sensor 2 and so forth.

An example of a sample 3 in the form of a first lateral flow device 10 may be imaged using the camera of the mobile device 49 to obtain the sample image $I^S$ (step S1 in FIG. 14). Such an image 50 may also be shown on the display 51 of the mobile device 49.

A flash LED integrated into the mobile device 29 may provide a light source 9 for illuminating the lateral flow device 10 in addition to, or instead of, ambient light.

The mobile device 49 includes one or more processors (not shown). The step of extracting the first and second mono-colour arrays $L^1$, $L^2$ or images $I^1$, $I^2$ (step S2 in FIG. 14) may be carried out by the one or more processors (not shown). The step of determining the filtered array $L^F$ or image $I^F$ based on the first and second mono-colour arrays $L^1$, $L^2$ or images $I^1$, $I^2$ respectively (step S3 in FIG. 14) may be carried out by the one or more processors (not shown) of the mobile device 49.

If the computing power of the mobile device 49 is sufficient, a preview image displayed on the display 51 may show filtered images $I^F$ instead of the initial, unprocessed sample image $I^S$ before the camera of the mobile device 49 is activated to obtain an image. This may help a user to arrange the mobile device 49 in the right position with respect to the lateral flow device 10.

In this way, the mobile device 49 may be used to perform qualitative colorimetric analysis of the lateral flow device 10 with an improved limit of detection provided by use of the filtered array $L^F$ or image $I^F$.

Where quantitative colorimetric analysis is desired, the step of determining a concentration of the analyte (step S3a in FIG. 14) may be carried out by the one or more processors. The mobile device 49 may be used to obtain a calibration image $I^C$ and calibration array J (steps Soa to Sod in FIG. 14). The calibration image $I^C$ may be obtained and the calibration array J determined either before or after obtaining one or more sample images $I^S$.

The sample image $I^S$ processed to determine the filtered array $L^F$ or image $I^F$ need not be the entire frame of the image sensor 2 (FIG. 1). For example, the mobile device 49 (FIG. 1) may be used to obtain a full sensor image $I^{FS}$ which corresponds to the whole field of view 4 of the camera (not shown) and which contains an image of the sample 3, 10. A first sub-region 52 of the full sensor image $I^{FS}$ may be identified which contains the sample 3, and the sample image $I^S$ (first image) may be obtained by extracting the first sub-region 52. The first sub-region 52 may be identified by the one or more processors (not shown) of the mobile device 49 using computer vision techniques.

In order to improve the accuracy of identifying the first sub-region 52, the sample 3 may include registration indicia or marks 53 for use in identifying the first sub-region 52. For example, registration indicia 53 may be arranged to outline or bracket the result viewing window 20 of the lateral flow device 10.

If the sample 3 does not include registration indicia 53, one or more objects (not shown) which include registration indicia 53 may be arranged on or around the sample 3 to demark the first sub-region 52.

An advantage of using sub-regions of a full sensor image $I^{FS}$ is that the need to obtain separate calibration images $I^C$ may be avoided.

For example, a calibration sample 54 may be arranged next to the lateral flow device 10. The calibration sample 54 may take a similar form to the lateral flow device 10, with a casing provided with a viewing window 55 through which a porous strip 5 supported in the casing may be viewed. The calibration sample 54 differs from the lateral flow device 10 in that the porous strip 5 of the calibration sample 54 includes a number of calibration regions 56, for example first, second and third calibration regions 56a, 56b, 56c. Each calibration region 56a, 56b, 56c is treated with a different reference concentration of labelling particle 6. The concentration of the test region 7 may be determined or interpolated from the known concentrations of the calibration regions 56a, 56b, 56c by comparing the relative entries of the filtered array $L^F$ or pixel of the filtered image $I^F$ against the entries of the calibration array J determined based on the calibration image $I^C$.

Only one calibration region 56 is needed for quantitative analysis. However, two or more calibration regions 56 spanning a range of concentrations may help to provide for more accurate quantification of the concentration of an analyte in the test region 7.

When the calibration sample 54 is arranged next to the sample 3 in the form of a lateral flow device 10, the sample image $I^S$ may be extracted from the full sensor image $I^{FS}$ as described hereinbefore. In the same way, the calibration image $I^C$ (second image) may be similarly extracted from the same full sensor image $I^{FS}$ by identifying a second sub-region 57 which contains the calibration regions 56a, 56b, 56c. The calibration sample 54 may also include registration indicia 53 for identifying the second sub-region 57. Registration indicia 53 identifying the first and second sub-regions 52, 57 are preferably distinguishable through the application of computer vision techniques if intended to be used in the same image. For example, the registration indicia 53 may demark different areas or shapes to indicate the first and second sub-regions 52, 57.

The preceding example has been explained with reference to a mobile device 49 and a lateral flow device 10 with images obtained in reflection. The same methods are equally applicable to images obtained in transmission. A mobile device 49 need not be used, and any digital camera may be used to obtain the sample images $I^S$, calibration images $I^C$ and/or full sensor images $I^{FS}$. Images may be processed and/or quantified by the same digital camera if it includes sufficient processing capacity.

Alternatively, where a mobile device 49 or other digital camera is used, all necessary images may be obtained without any processing by the device incorporating the image sensor 2. The images may subsequently be loaded onto a suitable data processing apparatus for processing to determine filtered images $I^F$ and calibration images $I^C$.

Experimental Results

Experimental work to verify the method of improving signal-to-noise ratio has been carried out using mobile device 49 in the form of a smart phone having an RGB camera and which is capable of exporting image data in .jpeg and raw data formats.

Experiments were carried out using samples in the form of porous strips 5 made from nitrocellulose. Such porous strips 5 are commonly employed in lateral flow devices 10, 25. Images were captured so that the rows of pixels each image were substantially aligned with a long side of a rectangular porous strip. Experiments were conducted using blank porous strips 5 and also on porous strips 5 including test regions 58 (FIG. 19) which had been treated with varying concentrations of gold-nanoparticles. Gold nanoparticles are commonly employed as labelling particle 6 in lateral flow devices 10.

The experimental samples only varied in one direction, x, parallel to the long side of the rectangular nitrocellulose strips. For ease of visualisation and presentation, data shall be presented by summing each image column into a single value. Given the one dimensional variability of the experimental samples, this does not remove important information. The same approach could also be applied to lateral flow devices 10, 25 in general if the image rows align with the flow direction.

Figure 16:
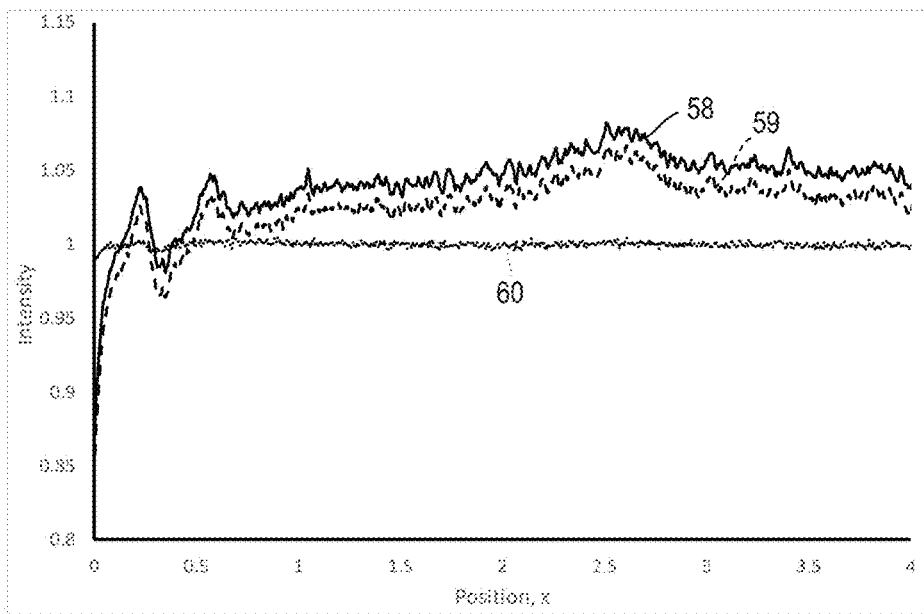
FIG. 16 shows experimental measurements of the background reflectance from a blank nitrocellulose strip.

Referring to FIG. 16, the intensity (normalised) of a blank porous strip 5 was obtained as a function of distance x parallel to the long side of the porous strip using red and green colour channels.

The red channel intensity profile 58 (solid line in FIG. 16) and the green channel intensity profile 59 (dashed line in FIG. 16) show similar features corresponding to background inhomogeneity of the blank porous strip 5. In terms of the previous notation, the red channel profile 59 corresponds to a mono-colour array $L^R$ with entries:

$$L_n^R = \sum_{m=1}^{M} I_{n,m,R}^S \quad (6)$$

and similarly for the green channel profile. With the green channel as the first mono-colour array $L^G=L^1$ and the red channel as the second mono-colour array $L^R=L^2$, a filtered profile 60 (dotted line in FIG. 16) was calculated according to equation 3. It may be observed that background inhomogeneity of the blank porous strip 5 has been substantially removed from the filtered profile 60.

Figure 17:
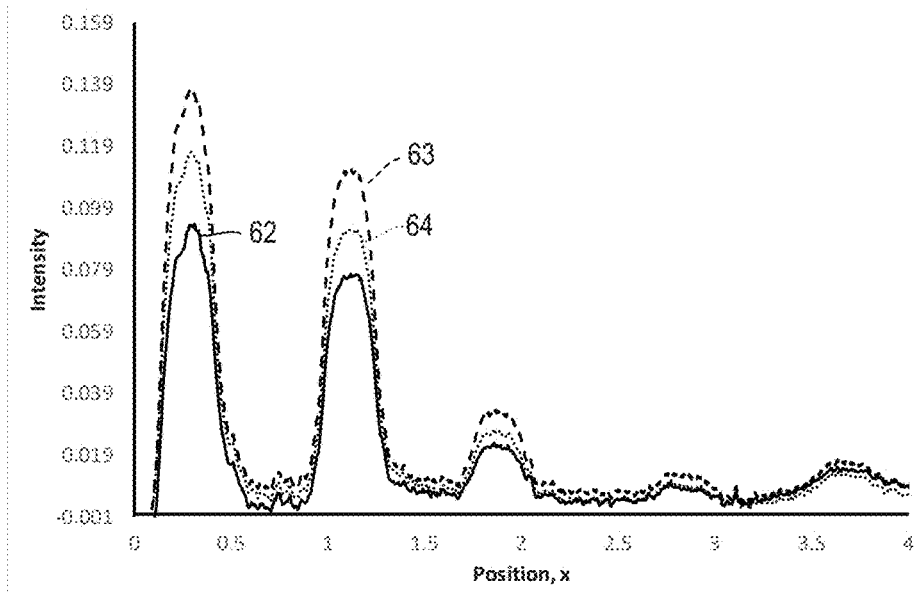
FIG. 17 shows the reflectance of a nitrocellulose strip including a number of test regions treated with gold nanoparticles for red, green and blue colour channels.
Figure 18:
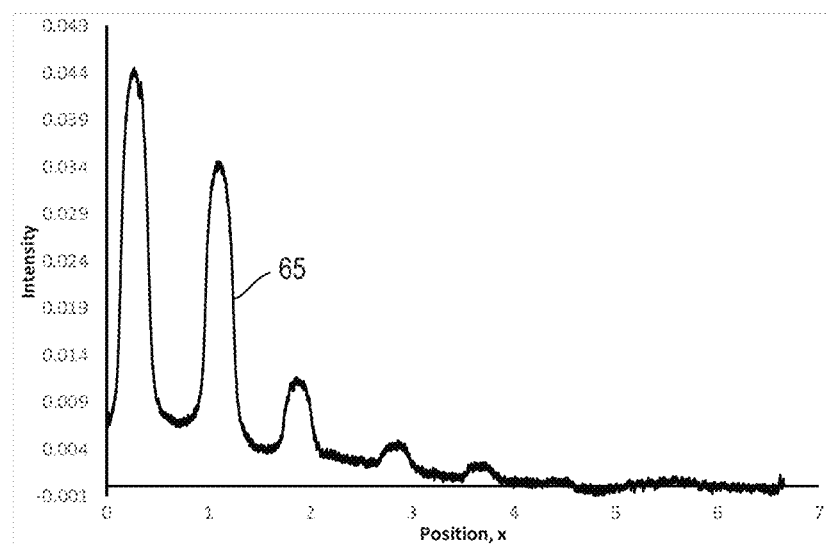
FIG. 18 shows filtered data obtained by taking the difference of green and red channel data shown in FIG. 17.
Figure 19:
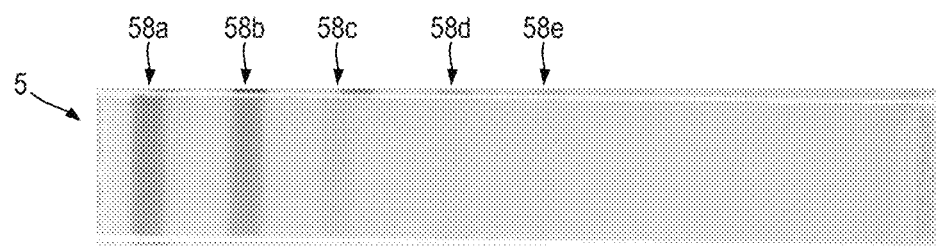
FIG. 19 is a photograph of the nitrocellulose strip corresponding to the data shown in FIGS. 17 and 18.

Referring to FIGS. 17, 18 and 19, the application of the methods of reducing signal-to-noise ratio is illustrated in FIGS. 17 and 18 in relation to a porous strip 5 including a number of test regions 58a, 58b, 58c, 58d, 58e and shown in FIG. 19.

Referring in particular to FIG. 17, intensity profiles 62, 63, 64 corresponding to red, green and blue colour channels respectively (solid, dashed and dotted lines in FIG. 17) were obtained in the manner described in relation to FIG. 16. The test regions 58 corresponding to greater concentrations of gold nanoparticles may be readily observed. However, as the concentration of gold nanoparticles is reduced, it becomes difficult to clearly differentiate the test regions 58 amongst the background inhomogeneity of the porous strip 5.

Referring in particular to FIG. 18, a filtered profile 65 obtained as a difference between the red intensity profile 62 and the green intensity profile 63 is shown. It may be observed that the background inhomogeneity of the porous strip 5 has been substantially reduced. In the filtered profile 65, even the test regions 58 corresponding to the lowest concentrations of gold nanoparticles are clearly distinguishable.

Figure 20:
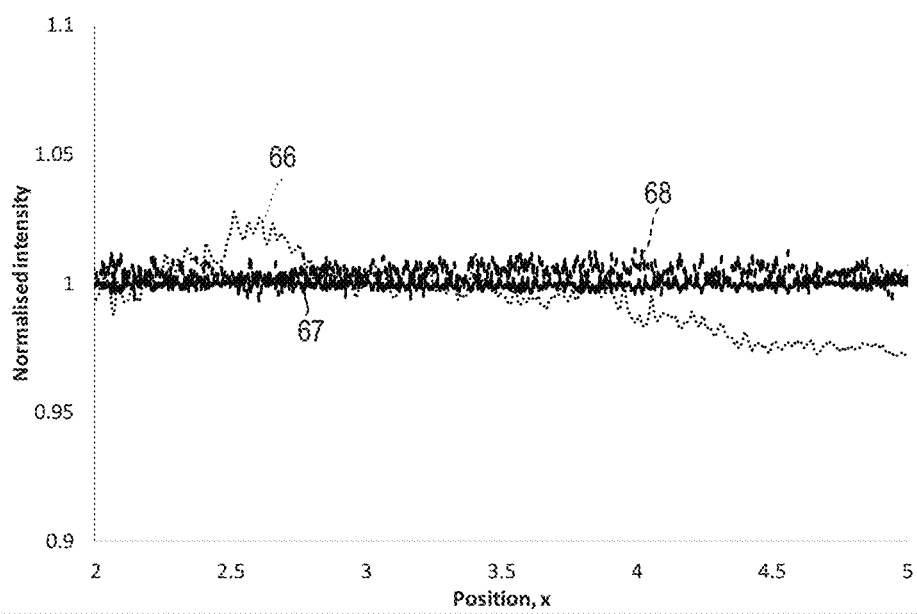
FIG. 20 shows a comparison between filtered data calculated as differences and filtered data calculated as ratios.

Referring to FIG. 20, filtered profiles calculated as differences and ratios are compared.

The total intensity profile 66 (dotted line in FIG. 20) for a blank porous strip 5 (magnitude of a vector of the Red, Green and Blue intensities) exhibits the background inhomogeneity typical of porous strips 5. In order to examine the differences between obtaining a ratio as opposed to a difference, a ratio filtered profile 67 (solid line in FIG. 20) was calculated according to equation (3) and a weighted difference filtered profile 68 (dashed line in FIG. 20) was calculated according to equation (4). In both cases, the first and second mono-colour arrays $L^1$, $L^2$ were obtained using green and red colour channels respectively, i.e. $L^1=L^G$ and $L^2=L^R$. It may be observed that either filtered profile 67, 68 substantially reduces the magnitude of background variations (noise). Moreover, the ratio filtered profile 67 and the weighted difference filtered profile 68 differ by less than the magnitude of residual background variations (residual noise).

Alternative Samples Types

Although examples have been described in relation to lateral flow devices 10, 25, the methods disclosed herein can also be used with other types of sample 3 which minimal modifications.

Figure 21:
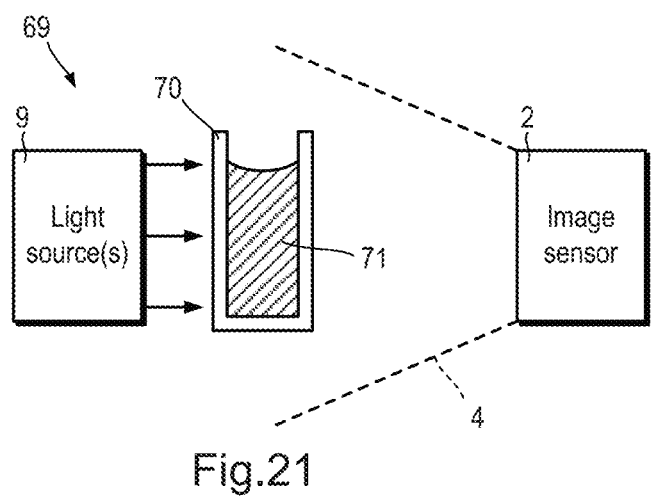
FIG. 21 illustrates a second system for colorimetric analysis of a cuvette.

For example, referring also to FIG. 21, a second system 69 for colorimetric analysis is shown.

The second system 69 includes a sample 3 in the form of a container, for example a cuvette 70, containing a liquid sample 71. The liquid sample 71 may be illuminated by a light source 9 and the colour of the liquid sample 71 may be measured using the image sensor 2 in a transmission arrangement. The signal-to-noise ratio may be improved for the second system 69 using the methods of the present specification. Similarly, the second system 69 may be used for fluorescence assays as described hereinbefore.

The difference in the second system 69 is that instead of scattering by fibres 36, the correction removes the effects of dust, scratches, smudges and so forth on the sides of the cuvette 70. Additionally, the second system 69 can correct for varying quantities of suspended particulate matter 72

Figure 23:
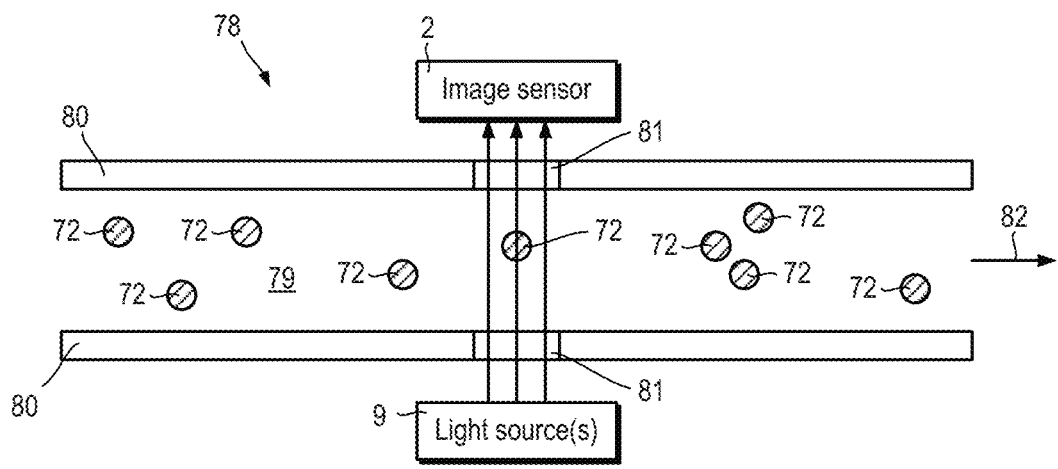
FIG. 23 illustrates a fourth system for colorimetric analysis of a flowing liquid.

(FIG. 23) in the liquid sample 71. For example, samples from a body of water may be obtained to check the concentrations of a dissolved pollutant. Liquid samples 71 taken at different times may include differing amounts of silt or other particles in suspension. Although samples may be left to allow suspended particulate matter 72 (FIG. 23) to sediment out, this is impractical for field-testing. Using the methods of the present specification, the scattering from suspended particulate matter 72 (FIG. 23) may be reduced or removed by filtering. In this way, the hereinbefore described methods may be used to speed up the process of analysing liquid samples 71 which show inherent variability due to, for example, suspended particulate matter 72 (FIG. 23).

Figure 22:
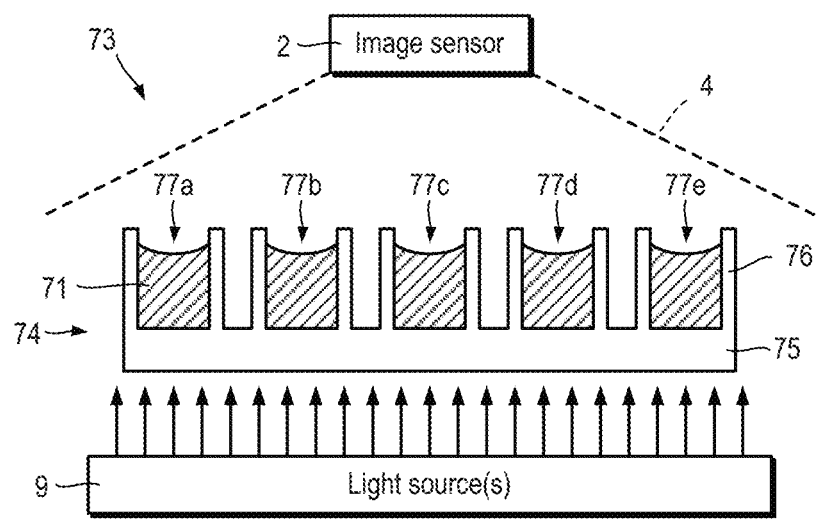
FIG. 22 illustrates a third system for colorimetric analysis of an assay plate.

Referring also to FIG. 22, a third system 73 for colorimetric analysis is shown.

The third system 73 includes a sample 3 in the form of an assay plate 74. The assay plate 74 includes a transparent base 75. A number of hollow cylinders 76 extend perpendicularly from the transparent base 75 to provide a number of sample wells 77, for example a first sample well 77a, second sample well 77b and so forth. Each sample well 77 may be provided with a different liquid sample 71. For example, the first sample well 77a may hold a first liquid sample 71, the second sample well 77b may hold a second liquid sample 71 and so forth. The sample wells 77 may extend in one direction. More typically, the sample wells 77 extend in two directions to form an array. The light source 9 may be used to illuminate the transparent base of the sample wells 7, and the image sensor 2 may be used to capture an image of all or some of the sample wells 7.

The colour of each well may be analysed. Using the methods of the present specification, the signal-to-noise ratio may be improved. This can allow colorimetric analysis of all or part of an assay plate 74 to be analysed concurrently.

When the sample 3 is in the form of an assay plate 70, the sources of inhomogeneity giving rise to a background profile 39 are not fibres 36. Similarly to the cuvette 70, dust, scratches, smudges and so forth on the assay plate 74 surfaces may cause unwanted scattering.

Referring also to FIG. 23, a fourth system 78 for colorimetric analysis is shown.

The fourth system 78 includes a sample 3 in the form of a channel 79 through which a liquid sample 71 flows. The channel 79 is defined by walls 80 and includes windows 81 to permit the light from a light source 9 to cross the channel 79 and be imaged by an image sensor 2. Alternatively, if the walls 80 are transparent, windows 81 may not be needed. The channel 79 may be a pipe. Liquid flows through the channel 79 in a flow direction 82. The liquid may include suspended particulate matter 72, for example silt in river water.

The fourth system 78 may be used to analyse the concentration of a pollutant, or other analyte, which is present in the liquid flowing through the channel. The pollutant or other analyte may absorb at non-visible wavelengths, and may be imaged using an infrared or ultraviolet light source 9 and detected using an image sensor 2 having suitable colour channels. In general, the quantity of particulate matter 72 suspended in liquid flowing through the channel 79 may vary with time. Inhomogeneity in the background absorbance/scattering due to suspended particulate matter 72 can have a detrimental effect on both the limit of detection and the resolution of detecting the monitored pollutant or other analyte. The signal due to the particulate matter 72 may be reduced or removed by applying the filtering methods described hereinbefore.

Figure 24:
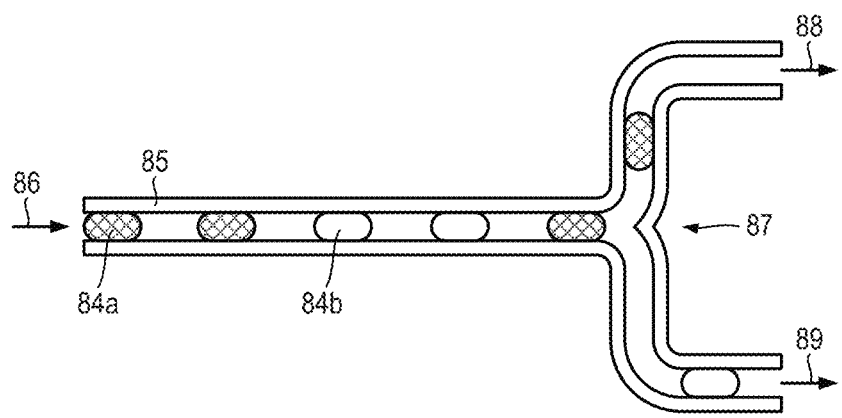
FIG. 24 illustrates a fifth system for colorimetric analysis of a microfluidic device.

Referring also to FIG. 24, a fifth system for colorimetric analysis is shown.

The fifth system 83 is a microfluidic system used for sorting droplets 84 which may contain a target analyte. Droplets 84a, 84b flow along a channel 85 through in a flow direction 86. Some droplets 84a include the target analyte whilst other droplets 84b do not. At a T junction 87, the droplets 84a, 84b are sorted according to the presence or absence of the analyte by applying suction to either a first exit port 88 or a second exit port 89. The sorting of the droplets 84a, 84b may be based on colorimetric analysis of the droplets 84a, 84b approaching the T-junction 87. Where the channels defining the fifth system are made of transparent material, the colorimetric analysis may be performed by illuminating the fifth system $8_3$ from below and obtaining an image from above. The fifth system $8_3$ may operate based on fluorescence of the droplets 84a containing the analyte, in which case an ultraviolet light source 9 may be used.

The hereinbefore described methods can also be used to filter out background inhomogeneity of the fifth system. For example, the walls defining the channel 85 may be scratched or irregular, and dust or surface scratches may also result in unwanted background variations. Using the hereinbefore described methods the signal-to-noise ratio for images of the fifth system may be improved. This may allow more sensitive and/or more accurate sorting of the droplets 84a, 84b.

Second Method

For some tests, it may be desirable to detect and quantify the concentrations of two or even more than two analytes in the same sample 3 concurrently. A description follows of a second method, which is a method of determining the presence or concentration of one or more analytes in a sample.

Additionally or alternatively, many samples which may contain one or more analytes of interest may be coloured, for example blood. Other samples 3 may display a range of colours depending on a concentration of, for example, urine or other biologically derived substances or byproducts. Additionally, the material of a porous strip 5 may have a slight coloration such that the reflectance/transmittance of the porous strip 5 at different wavelengths varies to an extent which limits the potential for reducing the signal due to background inhomogeneity.

Determining the presence or concentration of one or more analytes in a sample, whether the sample is coloured or substantially clear, may be useful since this may allow lower grade materials having a degree of coloration to be used for the porous strip 5 of a lateral flow device 10, 25. In this way, the material cost of a lateral flow device 10, 25 may be reduced, and additionally the environmental impact of producing fibres having a high degree of whiteness (for example using chemical bleaching) may be reduced.

In general, concentrations of K−1 different analytes may be determined, whilst correcting for inhomogeneity of a porous strip 5 or similar source of background scattering, by processing a sample image $I^S$ obtained using an image sensor 2 having K different colour channels. Some of the K−1 analytes may not be of direct interest, for example, some of the K−1 analytes may be substances or compositions which provide the coloration of a sample 3, for example dyes. However, accounting for analytes providing coloration of a sample 3 can allow more accurate detection and quantification of one or more analytes of interest contained in or supported on the sample 3.

A sample 3 may in general include K−1 analytes. The second method may be applied to determine the presence or concentration of K−1 analytes when the image sensor 2 used to obtain sample images $I^S$ has K colour channels. The number K−1 of analytes is one less than the number K of colour channels to allow correction for scattering from the background inhomogeneity of a porous strip 5, cuvette 70, test well 77, suspended particulate matter 72, or any similar source of background scattering. Some of the analytes may be substances or compositions which give rise to the coloration of a sample. Quantifying substances or compositions which give rise to sample coloration may not be of direct interest, however, it can allow more sensitive detection and/or more accurate quantification of one or more analytes of interest contained within a coloured sample such as urine, blood, and so forth.

A sample image $I^S$ (or first image) is obtained or received in the same way as the first method and, in the same way as the first method contains an image of the sample 3.

Mono-colour arrays $L^1, \ldots, L^k, \ldots, L^K$ corresponding to each of the colour channels are extracted from the sample image $I^S$. All of the mono-colour arrays $L^k$ have the same number of entries $N_e$, and each entry is determined by aggregating one or more pixels of the first image in the same way as the first method. It is also possible to apply the second method to mono-colour images $I^1, \ldots, I^k, \ldots, I^K$. However, in practice this may be neither necessary nor desirable since the subsequent processing of the second method is more complex. Each entry of the mono-colour arrays $L^k$ is an aggregation of one or more pixel intensity values $I_{n,m,k}$.

The second method requires corresponding absorbance values to be estimated. A set of mono-colour absorbance arrays $A^1, \ldots, A^k, \ldots, A^K$ corresponding to each colour channel is determined. Each mono-colour absorbance array $A^k$ includes a number $N_e$ of entries $A^k_i$ which correspond to the entries of the mono-colour array $L^k$. Direct determination of absorbance values from sample images $I^S$ may be difficult because the incident and transmitted/reflected flux values may be difficult to determine in an imaging arrangement.

However, when the sample 3 is a porous strip 5 of a lateral flow test device 10, 25, the mono-colour absorbance arrays $A^1, \ldots, A^k, \ldots, A^K$ may be estimated from a sample image $I^S$ encompassing a test region 7 and surrounding regions of untreated porous strip 5.

Referring also to FIGS. 25 to 34 a method of obtaining values for the mono-colour absorbance arrays $A^1, \ldots, A^k, \ldots, A^K$ from a porous strip 5 of a lateral flow device 10, 25 is explained with reference to theoretically modelled organic photodetector (OPD) signals for a system including blue dye in addition to gold nanoparticles. In the modelled system, the image sensor 2 is taken to be an array of OPDs, however, the image sensor 2 may use any other type of photodetector such as a charge couple device CCD or other type of light sensor typically employed in a camera.

Figure 25:
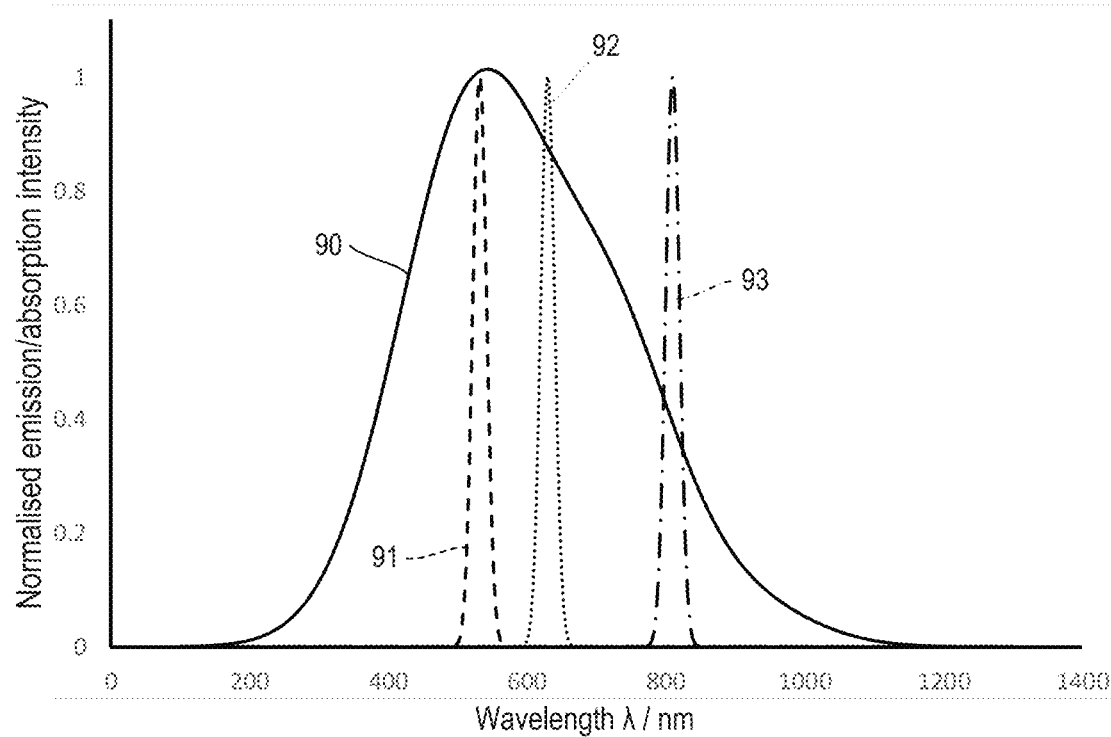
FIG. 25 illustrates a typical organic photodetector sensitivity profile and green, red and near infrared light emission profiles typical of organic light emitting diodes.

Referring in particular to FIG. 25, a model for generating theoretical OPD signals is based on a representative OPD absorption profile 90, which is a function of wavelength λ, in combination with representative LED emission profiles 91, 92, 93, which are each functions of wavelength λ. The first LED emission profile 91 corresponds to a typical green OLED as a light source 9, the second LED emission profile 92 corresponds to a typical red OLED as a light source 9, and the third LED emission profile 93 corresponds to a typical near infrared (NIR) OLED as a light source 9. The OLED emission profiles 91, 92, 93 may equivalently be considered as transmission profiles of a mosaic filter (see e.g. profiles 32, 33, 34, 35 in FIG. 6) in a case where uniform white light is used as a light source 9 to illuminate a sample 3, without significantly affecting the interpretation of the theoretical model.

Figure 26:
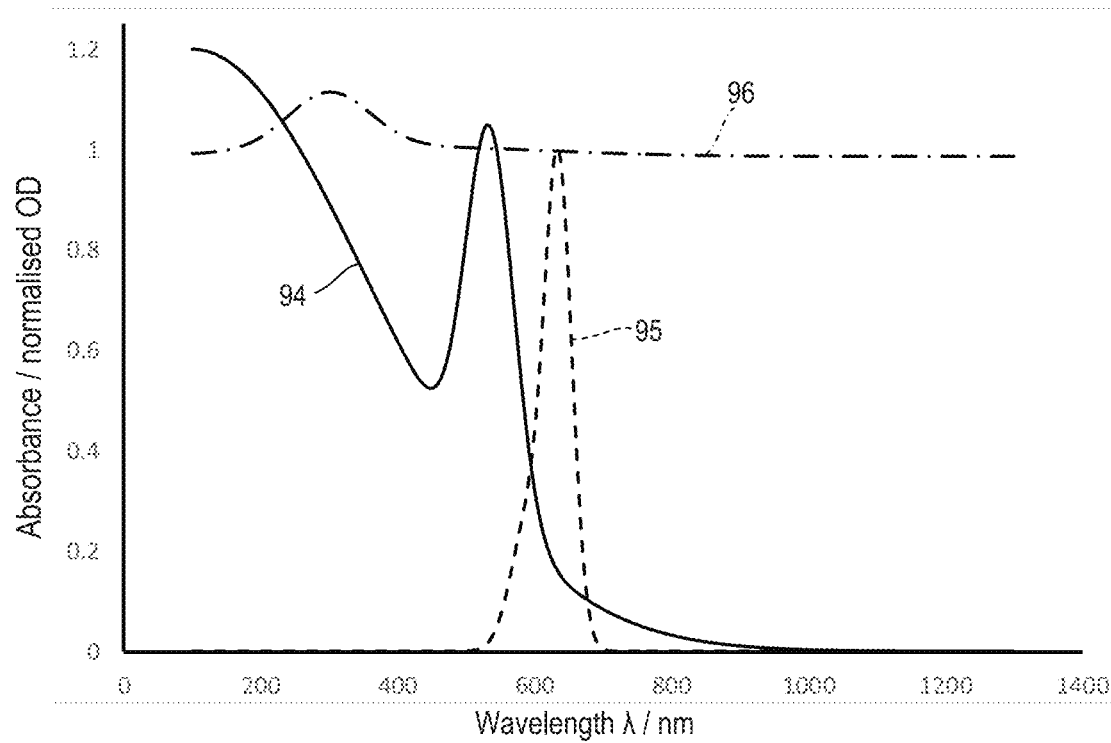
FIG. 26 illustrates typical absorbance profiles for gold nanoparticles, a blue dye and nitrocellulose fibres.

Referring in particular to FIG. 26, further inputs to the model for generating theoretical OPD signals include representative absorption profiles 94, 95, 96 for gold nanoparticles, a blue dye and nitrocellulose fibres 36 respectively. The first absorption profile 94 is a wavelength λ dependent function corresponding to the absorbance of gold nanoparticles. The second absorption profile 95 is a wavelength λ dependent function corresponding to the absorbance the blue dye. The third absorption profile 96 is a wavelength λ dependent function corresponding to the absorbance of nitrocellulose fibres 36 forming a porous strip 5.

Figure 27:
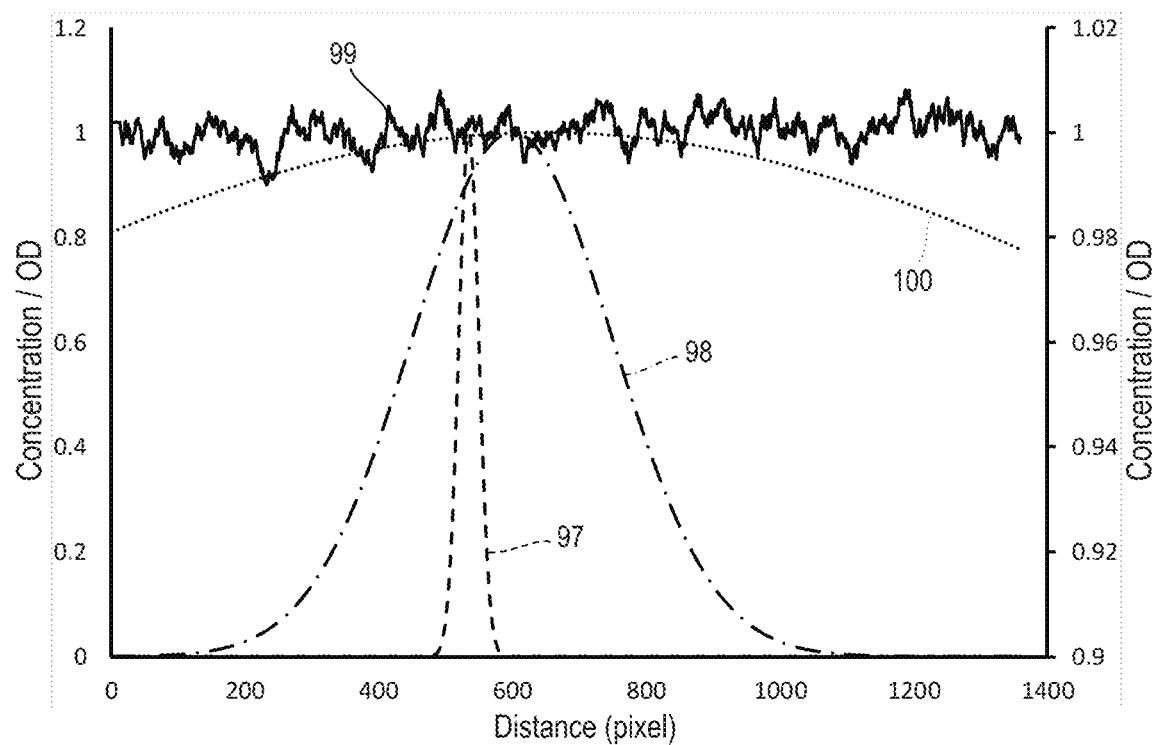
FIG. 27 illustrate assumed concentration profiles for gold nanoparticles, for a blue dye and for nitrocellulose fibres forming a porous strip.

Referring in particular to FIG. 27, further inputs to the model for generating theoretical OPD signals include assumed concentration profiles 97, 98, 99 of gold nanoparticles, blue dye and nitrocellulose fibres respectively. In the model, it is assumed that the lateral flow test device 25 is back-illuminated and that the light transmitted through the porous strip 5 is imaged using an image sensor 2 composed of a number of OPDs.

The X-axis of FIG. 27 is distance in units of pixels of the image sensor 2. The first assumed concentration profile 97, plotted against the primary Y-axis (range 0 to 1.2), corresponds to a position dependent concentration of gold nanoparticles. The second assumed concentration profile 98, plotted against the primary Y-axis (range 0 to 1.2), corresponds to a position dependent concentration of blue dye. The third assumed concentration profile 99, plotted against the secondary Y-axis (range 0.9 to 1.02), corresponds to a position dependent concentration of nitrocellulose fibres 36. The third assumed concentration profile 99 includes fluctuations of the nitrocellulose fibre 36 concentration (meaning the density such, for example, fibre volume fraction) with position along the porous strip 5. Also indicated in FIG. 27 is an illumination profile 100 representing a position varying illumination intensity along the length of the porous strip 5. The illumination profile 100 is assumed to be the same for modelled green, red and NIR OLEDS.

Figure 28:
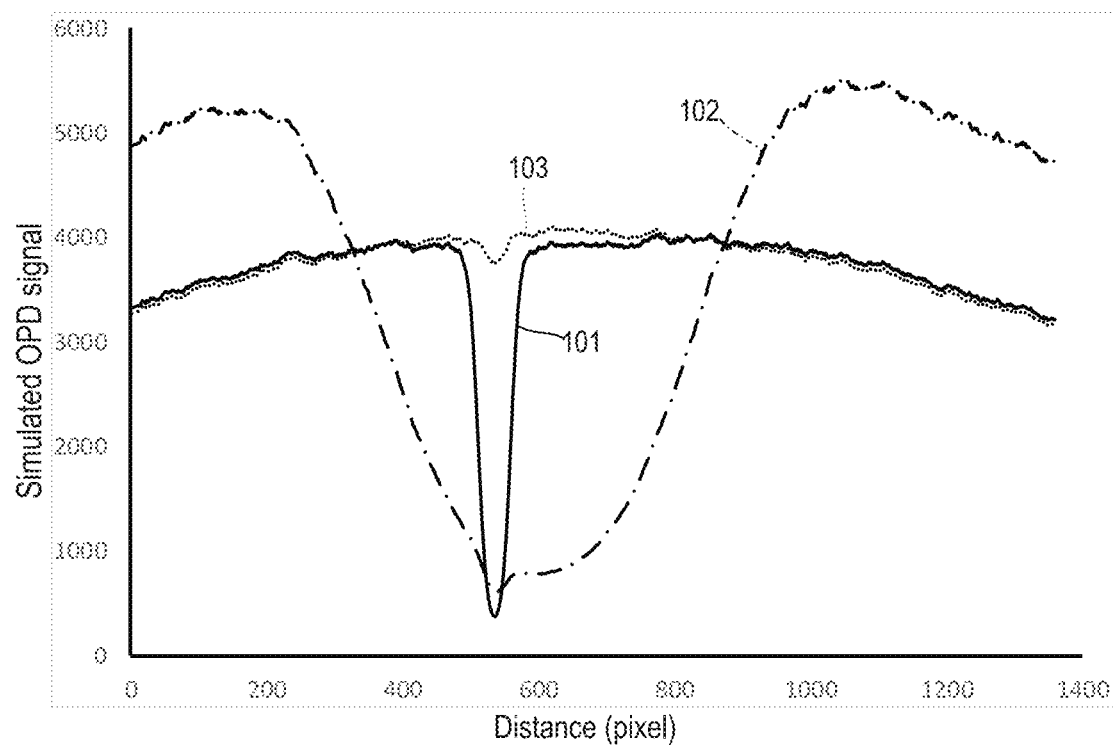
FIG. 28 illustrates simulated organic photodetector signals obtained based on the data shown in FIGS. 51 to 53.

Referring in particular to FIG. 28, simulated OPD signals 101, 102, 103 corresponding to light from green, red and NIR OLEDs respectively may be estimated based on the emission/transmission profiles 91, 92, 93, illumination profile 100, concentration profiles 97, 98, 99 and absorbance profiles 94, 95, 96. Noise generated based on pseudorandom numbers was added to simulated OPD signals 101, 102, 103 to simulate OPD noise.

Figure 29:
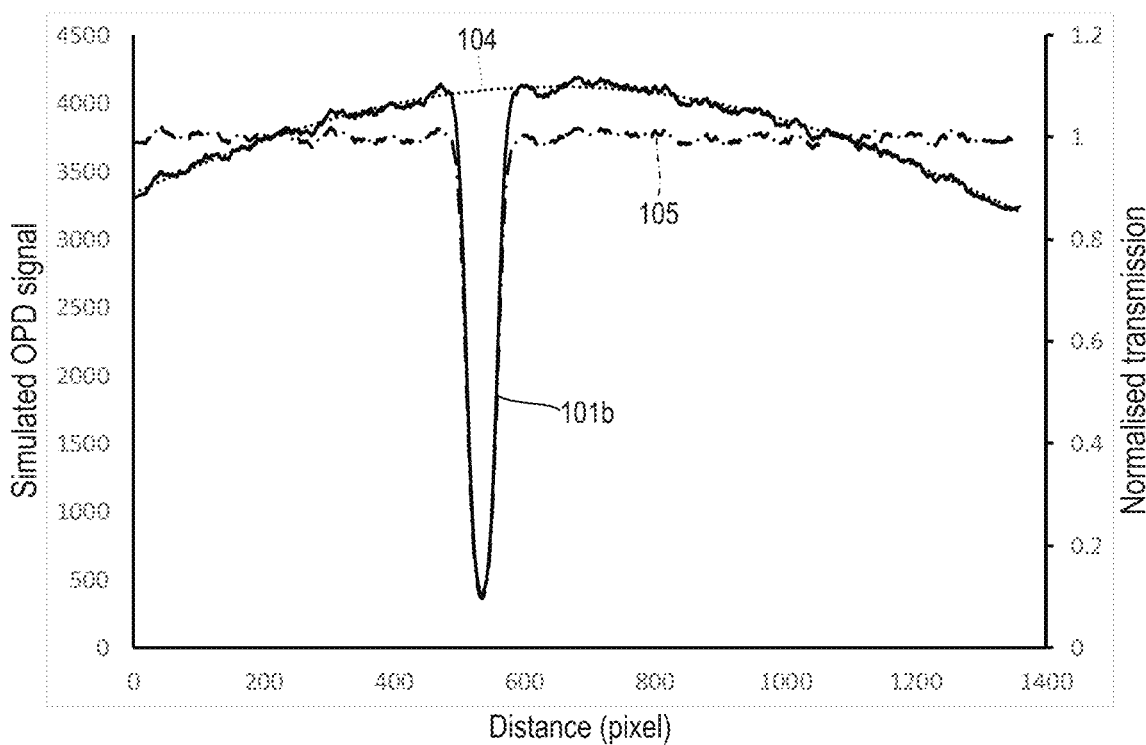
FIG. 29 illustrates filtering a simulate organic photodetector signal corresponding to a green organic light emitting diode.

Referring in particular to FIG. 29, a simulated green OPD signal 101b is shown which is calculated for a case in which the blue dye concentration profile 98 was set to zero everywhere.

As a first step in extracting green absorbance values, a slowly varying background profile 104, plotted against the primary Y-axis (range 0 to 4500), is fitted to the simulated green OPD signal 101b, plotted against the primary Y-axis (range 0 to 4500). The background profile 104 represents an approximation to the average intensity, $T_0$, transmitted by the nitrocellulose fibres 36 of the porous strip 5. The simulated green OPD signal 101b represents the transmitted intensity, T, through the porous strip 5 and the gold nanoparticles. A normalised green transmission profile 105 is calculated as $T/T_0$, plotted against the secondary Y-axis (range 0 to 1.2). It may be observed that the normalised green transmission profile 105 retains fluctuations resulting from the point-to-point fluctuations in the nitrocellulose fibre 36 concentration profile 99.

Figure 30:
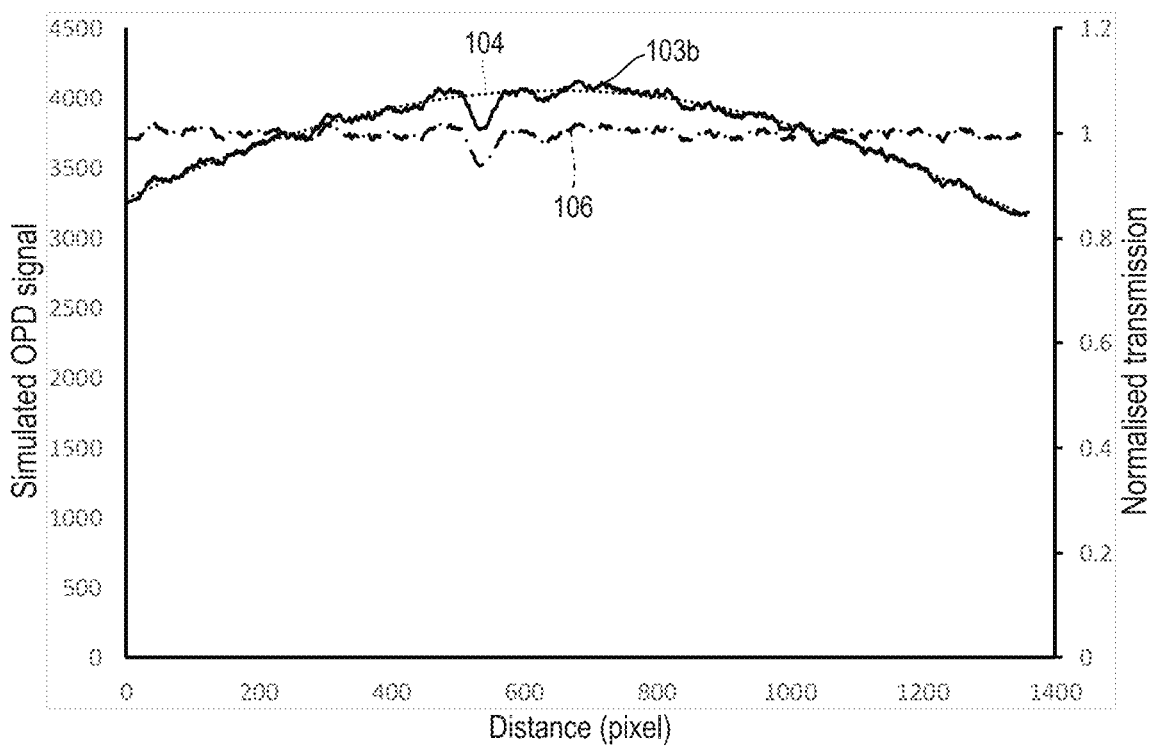
FIG. 30 illustrates filtering a simulate organic photodetector signal corresponding to a near infrared organic light emitting diode.

Referring in particular to FIG. 30, a simulated NIR OPD signal 103b is shown which is calculated for a case in which the blue dye concentration profile 98 is zero everywhere.

As a first step in extracting IR absorbance values, a slowly varying background profile 104, plotted against the primary Y-axis (range 0 to 4500) is fitted to the simulated NIR OPD signal 103b, plotted against the primary Y-axis (range 0 to 4500). Given the present modelling assumptions, the background profile 104 is the same for green and NIR data. However, in practice the background profile 104 may vary for different wavelengths λ of light, for example, when multiple light sources illuminate the sample 3. A normalised NIR transmission profile 106 is calculated as $T/T_0$, plotted against the secondary Y-axis (range 0 to 1.2).

Figure 31:
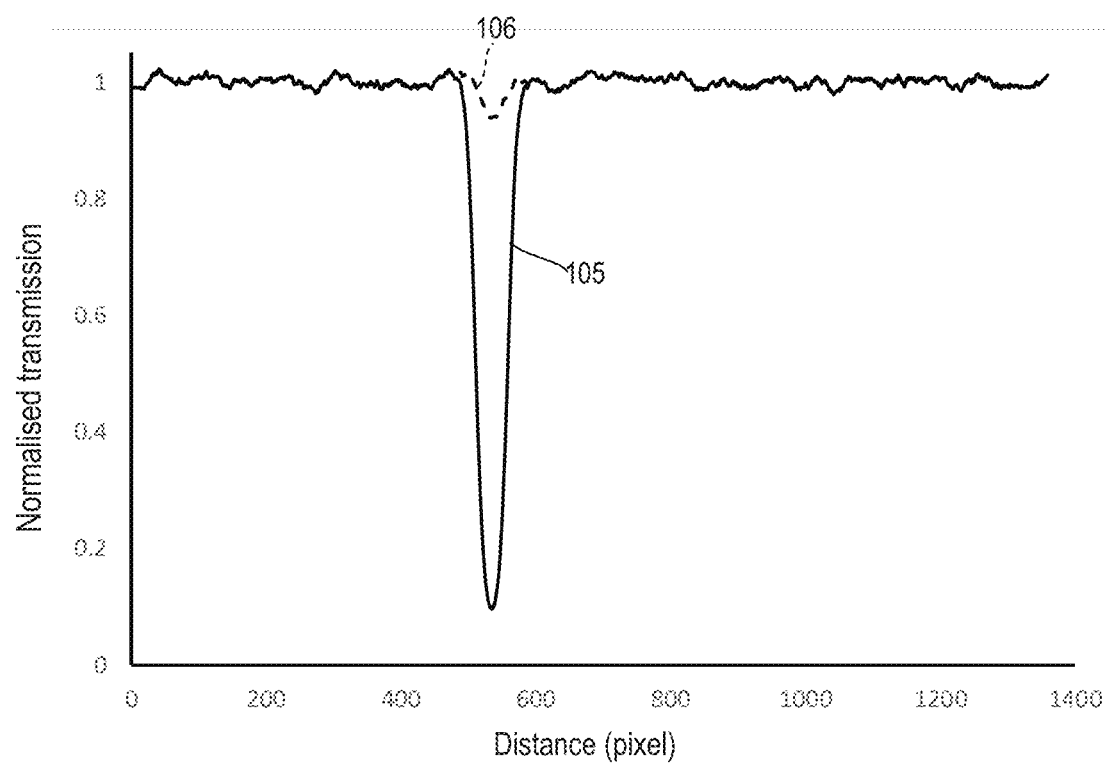
FIGS. 31 and 32 illustrate converting normalised transmission values to absorbance values.
Figure 32:
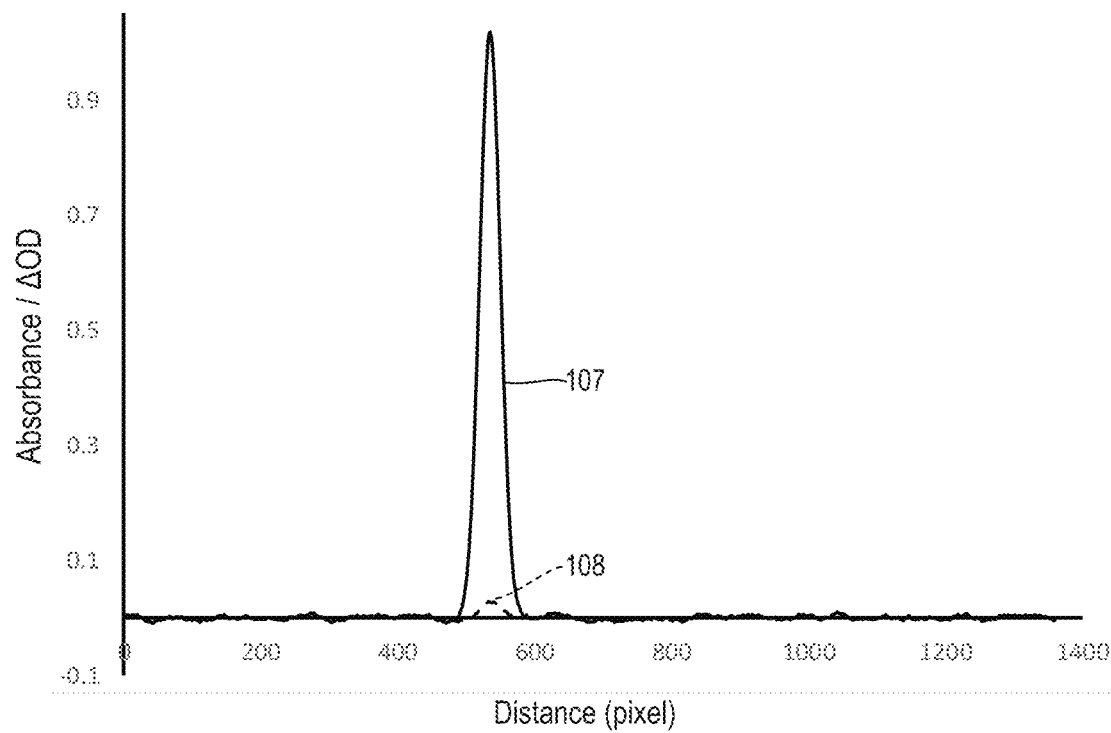

Referring in particular to FIGS. 31 and 32, the normalised transmission profiles 105, 106 are converted to absorbance values according to the formula $A=-\log_{10}(T/T_0)$. A first simulated absorbance profile 107 is obtained corresponding to the green OLED and comprising green absorbance values $A_G(x)$ at pixel position x. A second simulated absorbance profile 108 comprising NIR absorbance values $A_{NIR}(x)$ is obtained corresponding to the NIR OLED. The absorbance values calculated in this fashion are more strictly viewed as changes in absorbance relative to a perfectly uniform nitrocellulose strip having the same concentration (density/fibre volume fraction) as the average concentration (density/fibre volume fraction) of the porous strip 5. Such values may also be referred to as delta-optical density or ΔOD values. Although the calculation has been outlined with reference to a transmission geometry, analogous calculations may be performed for a reflection geometry.

Although the method of obtaining absorbance values has been explained in relation to a one-dimensional model, the model may be extended to encompass two-dimensional variations in concentrations.

The entries $A^k_i$ of each mono-colour absorbance array $A^k$ may be determined by summing or averaging the estimated absorbance values corresponding to several pixel positions, for example summing $A_G(x)$ or $A_{NIR}(x)$ across several pixel positions. In general, each entry $A^k_i$ corresponds to an entry of a mon-colour array $L^k_i$.

Alternatively, each entry $A^k_i$ of each mono-colour absorbance array $A^k$ may be estimated using a scatterplot of two or more sets of estimated absorbance values to determine absorbance "fingerprint" values as described hereinafter. For example, absorbance fingerprints may be obtained for each of several test regions 7 of a single porous strip 5.

Figure 33:
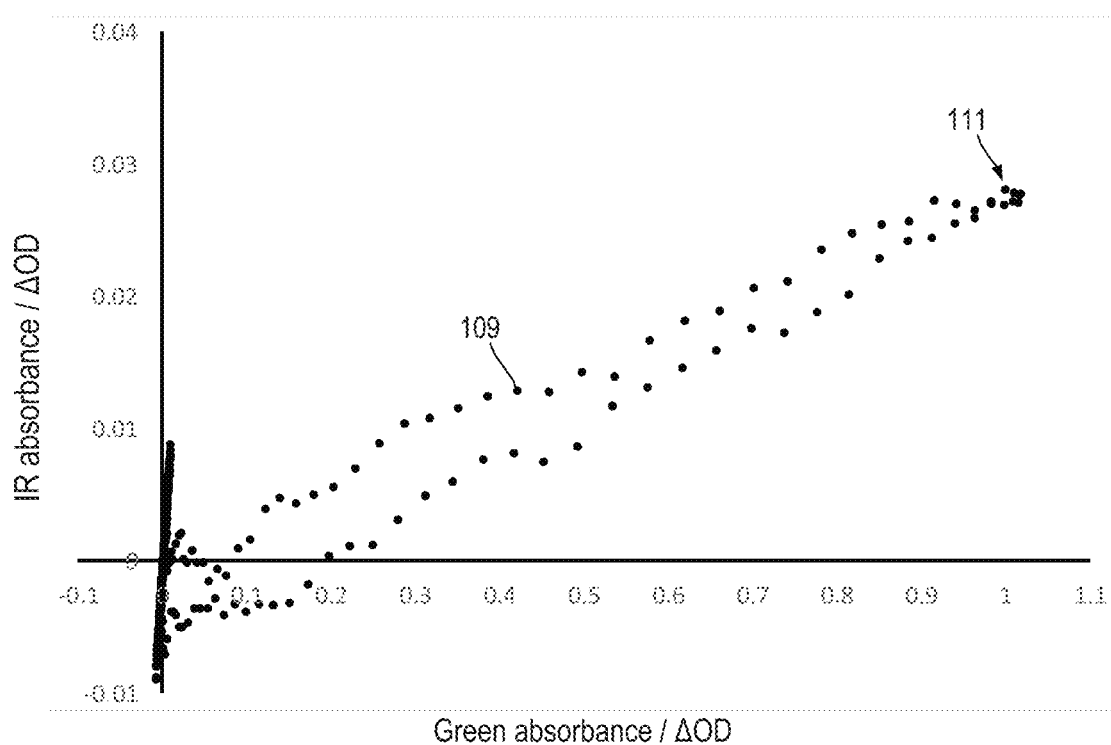
FIGS. 33 and 34 illustrate estimating absorbance fingerprint values corresponding to gold nanoparticles and nitrocellulose fibres.
Figure 34:
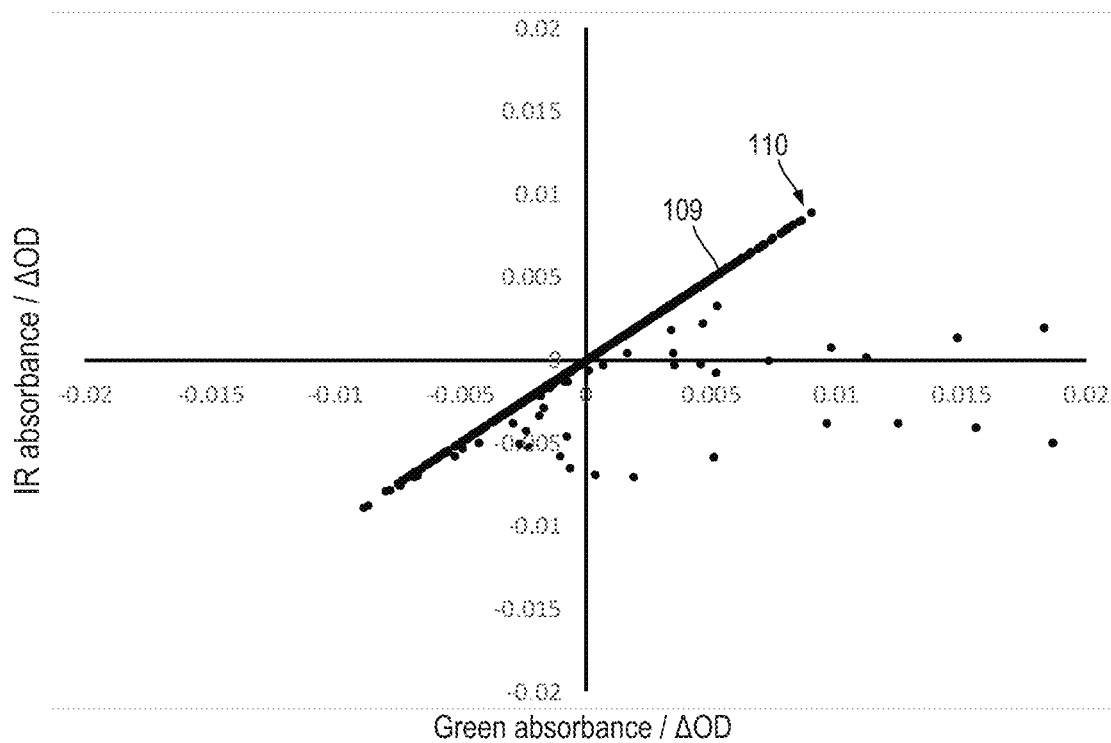

Referring in particular to FIGS. 33 and 34, the estimation of absorbance fingerprint values is illustrated. Estimation of absorbance fingerprint values is mainly of interest for obtaining coefficients of the deconvolution matrix of Equation (15) explained hereinafter. Both of FIGS. 33 and 34 are scatter plots of the green simulated absorbance profile 107 plotted against the X-axis and the NIR simulated absorbance profile 108 against the Y-axis. Each data point 109 represents a pair of a green absorbance value $A_G(x)$ and a NIR absorbance value $A_{NIR}(x)$ at a particular position x of a simulated porous strip 5.

Two distinct correlations having different slopes may be observed in FIGS. 33 and 34. A first correlation is most easily seen in FIG. 34 and has approximately unitary slope. This corresponds to the nitrocellulose fibres, the interaction of which with green and NIR wavelengths is essentially the same in the model. By examining the extremal data points no of the first correlation, a pair of absorbance values attributable to the fluctuations in the nitrocellulose fibre 36 concentration profile 99, also referred to as the absorbance "fingerprint" of the nitrocellulose fibres 36 within the region of porous strip 5 corresponding to the scatterplot, may be estimated as $A^G_{NC}\approx 0.01$, $A^{NIR}_{NC}\approx 0.01$, or alternately $A_{NC}\approx (0.01, 0.01)$ using a vector notation.

A second correlation is most easily seen in FIG. 33 and has a much shallower slope representing the relatively strong response of the green light to the gold nanoparticles in comparison to the relatively weak response of the NIR light to the gold nanoparticles. In a similar fashion to the first correlation, for the second correlation an absorbance "fingerprint" corresponding to the gold nanoparticles may be estimated as $A^G_{NC}\approx 1$, $A^{NIR}_{NC}\approx 0.02$, or $A_{Au}\approx (1, 0.02)$ using a vector notation, based on the extremal points in and subtracting the signal due to variations in the nitrocellulose fibre 36 concentration profile 99. This method of estimating absorbance fingerprints may be extended to three or more wavelength bands of light, for example, by using 3D plots or N-dimensional analysis methods.

In this way, mono-colour absorbance arrays $A^1, \ldots, A^k, \ldots, A^K$ having entries $A^k_i$ in the form of absorbance fingerprint values may be determined for each of $N_e$ entries. Although the method of obtaining absorbance values described with reference to the simulated OPD signals 101, 102, 103 has been described with reference to simulated transmission data, the same method (with minor variations) is expected to be equally applicable to measured data, whether obtained in transmission or reflection geometries.

Other methods of converting mono-colour arrays $L^1, \ldots, L^k, \ldots, L^K$ into corresponding mono-colour absorbance arrays $A^1, \ldots, A^k, \ldots, A^K$ may be used, in particular when the sample 3 is not a porous strip 5. Mono-colour absorbance arrays $A^1, \ldots, A^k, \ldots, A^K$ having entries $A^k_i$ in the form of absorbance values measured according to any suitable method may be analysed in accordance with the equations set out hereinafter.

In general, each mono-colour absorbance array entry $A^k_i$ corresponds to a range of wavelengths which are detected by the $k^{th}$ of K colour channels. In effect, a mono-colour absorbance array entry $A^k_i$ represents an integral across the wavelength range transmitted by the corresponding filter of the $k^{th}$ colour channel (see FIG. 6). A mono-colour absorbance array entry $A^k_i$ corresponding to the $k^{th}$ of K colour channels may be viewed as the sum:

$$A^k_i = s^k_i + \sum_{j=1}^{K-1} \varepsilon^k_j c_j \qquad (7)$$

in which $s^k_i$ is the absorbance in the $k^{th}$ colour channel due to scattering from background inhomogeneity of the porous strip 5 or other source of background scattering, $c_{i,j}$ is the concentration of the $j^{th}$ analyte out of K−1 analytes at the location corresponding to mono-colour absorbance array entry $A^k_i$ and $ß^k_j$ is a coefficient relating the concentration $c_{i,j}$ to the absorbance of the $j^{th}$ analyte out of K−1 analytes within the $k^{th}$ colour channel. The concentrations $c_{i,j}$ are expressed in units of absorbance (optical density) corresponding to a reference colour channel, for example, the $1^{st}$ colour channel k=1. Thus, the coefficients $ß^k_j$ are each a ratio of the absorbance of the $j^{th}$ analyte between the $1^{st}$ and $k^{th}$ colour channels.

An absorbance column vector $A_i$ corresponding to the $i^{th}$ of $N_e$ regions of the sample image $I^S$ may be constructed using the corresponding mono-colour absorbance array entries $A^k_i$ for all colour channels:

$$A_i = \begin{pmatrix} A_i^1 \\ A_i^2 \\ M \\ A_i^K \end{pmatrix} \quad (8)$$

and similarly, a concentration column vector $c_i$ may be defined as:

$$c_i = \begin{pmatrix} c_{i,1} \\ c_{i,2} \\ M \\ c_{i,K-1} \\ c_{i,s} \end{pmatrix} \quad (9)$$

in which the concentration $c_{i,s}$ corresponding to the background absorbance $s^k_i$ is a dummy concentration which is set to the background absorbance in the reference colour channel, for example $s^1_i$ corresponding to the 1$^{st}$ colour channel k=1. The use of the dummy concentration in equivalent units to the analyte concentrations $c_{i,j}$ maintains appropriate scaling of measured absorbance values throughout the calculations described hereinafter. In practice, as explained hereinafter, calibration of the method typically includes obtaining measurements of the background scattering without any analytes, so obtaining a suitable value for the dummy concentration $c_{i,s}$ is not problematic. The absorbance vector $A_i$ may be expressed in terms of the coefficients $\varepsilon^k_j$ background absorbance $s^k_i$ and concentration vector $c_i$ using a matrix equation:

$$\begin{pmatrix} A_i^1 \\ A_i^2 \\ M \\ A_i^{K-1} \\ A_i^K \end{pmatrix} = \begin{pmatrix} \varepsilon_1^1 & \varepsilon_2^1 & \Lambda & \varepsilon_{K-1}^1 & s_i^1 \\ \varepsilon_1^2 & \varepsilon_2^2 & \Lambda & \varepsilon_{K-1}^2 & s_i^2 \\ M & M & O & M & M \\ \varepsilon_1^{K-1} & \varepsilon_2^{K-1} & \Lambda & \varepsilon_{K-1}^{K-1} & s_i^{K-1} \\ \varepsilon_1^K & \varepsilon_2^K & \Lambda & \varepsilon_{K-1}^K & s_i^K \end{pmatrix} \begin{pmatrix} c_{i,1} \\ c_{i,2} \\ M \\ c_{i,K-1} \\ c_{i,s} \end{pmatrix} \quad (10)$$

$$A = Mc$$

in which M is a square matrix having coefficients $M_{k,j} = \varepsilon^k_j$ for $1 \le j \le K-1$ and $M_{k,j} = s^k_j$ for $j=K$. By inverting the matrix M, unknown concentrations $c_i$ of analytes corresponding to the i$^{th}$ of $N_e$ regions of the sample image $I^S$ may be determined from the mono-colour absorbance arrays $A^1, \ldots, A^k, \ldots, A^K$ according to:

$$c_i = M^{-1} A_i \quad (11)$$

In order to apply Equation (11), it is necessary to know the coefficients $M_{k,j}$ of the matrix M, so that the inverse $M^{-1}$ may be calculated. When evaluating Equation (11), a value calculated corresponding to the background scattering "concentration" would ideally be equal to the corresponding dummy concentration $c_{i,s}$. The dummy concentration may be zero when absorbance values are estimated with reference to the average absorbance of a porous strip 5, as described hereinbefore. In practical circumstances, the value calculated corresponding to the background scattering "concentration" may deviate from the dummy concentration $c_{i,s}$. The size of the deviation may provide an indication of variations between different porous strips 5, cuvettes 71, test wells 77, and so forth. A large deviation may provide an indication of possible problems with a particular sample 3 or with the calibration of the matrix M coefficients $M_{k,j}$.

The coefficients $M_{k,j}$ of the matrix M may be determined from experimental measurements using calibration samples 54 with known concentration distributions $c_{i,j}$ of each analyte. Preferably, calibration regions 56 of a calibration sample 54 have substantially uniform concentration throughout. A measured set of absorbance values from a first calibration sample 54 may be represented by the reference absorbance vector $A^*_1$ and the corresponding reference concentrations by the reference concentration vector $c^*_1$. In general, for a number K of colour channels, a number K of calibration samples 54 and measurements are required. Alternatively, a single calibration sample 54 may include a number K of different calibration regions 56, each corresponding to a different calibration vector $c^*$. A fingerprint matrix F may defined using the set of reference absorbance vectors $A^*_1, \ldots, A^*_k$ by setting the coefficients of each reference absorbance vector $A^*_1, \ldots, A^*_k$ as the coefficients for a corresponding column of the fingerprint matrix F:

$$F = \begin{pmatrix} \uparrow & \uparrow & & \uparrow \\ A_1^* & A_2^* & \Lambda & A_K^* \\ \downarrow & \downarrow & & \downarrow \end{pmatrix} \quad (12)$$

and the corresponding calibration concentration vectors $c_1, \ldots, c_K$ may be set as the columns of a calibration matrix C:

$$C = \begin{pmatrix} \uparrow & \uparrow & & \uparrow \\ c_1 & c_2 & \Lambda & c_N \\ \downarrow & \downarrow & & \downarrow \end{pmatrix} \quad (13)$$

and the fingerprint matrix F and calibration matrix C are related according to:

$$F = MC \quad (14)$$

The coefficients $M_{k,j}$ of the matrix M can then be calculated as $M = FC^{-1}$, and the coefficients of the inverse matrix $M^{-1}$ can be calculated as $M^{-1} = CF^{-1}$. Thus, a set of unknown concentrations represented by a concentration vector $c_i$ may be recovered using $CF^{-1}$ as a deconvolution matrix for the estimated absorbance values represented by an absorbance vector $A_i$ according to:

$$c_i = CF^{-1} A_i \quad (15)$$

In this way, a set of unknown concentrations $c_{i,j}$ of K−1 analytes may be reconstructed from the estimates of the mono-colour absorbance array entries $A^k_i$ estimated from the sample image $I^S$ and a calibration image $I^C$. Where the sample 3 is a porous strip 5, the mono-colour absorbance array entries $A^k_i$ may be estimated by normalisation to a slowly varying background 104 as described in relation to FIGS. 29 and 30.

The actual physical concentration or number density of each analyte, for example in units of number·cm$^{-3}$, can be estimated from the reconstructed concentrations (i.e. absorbance values at the reference wavelength) using the Beer-Lambert law if the path length through the sample 3 and an attenuation coefficient for the j$^{th}$ analyte is known for the reference colour channel. If the attenuation coefficient for the j$^{th}$ analyte is not known for the reference colour channel, then the coefficients $M_{k,j} = \varepsilon^k_j$ (calculated by inverting the deconvolution matrix to obtain $M = FC^{-1}$) may be used to convert the concentration (absorbance) $c_{i,j}$ in terms of absorbance in the reference colour channel to an absorbance for a colour channel for which an attenuation coefficient is known.

In some examples, it may be convenient to normalise absorbance values with respect to a single reference calibration value, for example, $A^*_1$. For example, with normalisation relative to $A^*_1$, a normalised fingerprint matrix $F_n$ may be expressed as:

$$F = \begin{pmatrix} 1 & \frac{A_2^{*1}}{A_1^{*1}} & \Lambda & \frac{A_K^{*1}}{A_1^{*1}} \\ \frac{A_1^{*2}}{A_1^{*1}} & \frac{A_2^{*2}}{A_1^{*1}} & \Lambda & \frac{A_K^{*2}}{A_1^{*1}} \\ M & M & O & M \\ \frac{A_1^{*K}}{A_1^{*1}} & \frac{A_2^{*K}}{A_1^{*1}} & \Lambda & \frac{A_K^{*K}}{A_1^{*1}} \end{pmatrix} \quad (12b)$$

Each of Equations 7 to 15 may be normalised in this manner, to allow absorbance and concentration values to be expressed as fractions with respect to a reference calibration value, for example $A^*_1$.

Determination of Concentration and Calibration Matrix Values

The calibration is simplified in the case that pure (or substantially pure) samples of the K-1 different analytes having known concentrations are available for testing in reference conditions, for example, supported on a porous strip 5, or contained within a cuvette 71, test well 77, and so forth. In the following discussion, location/region index i is dropped for brevity. One of the calibration samples 54 or regions 56 should ideally correspond to only the background scattering, i.e. the porous strip 5, cuvette 71, test well 77, and so forth. In this case, determining the calibration matrix is simplified, since the determination of the concentration $c_j$ for each analyte for the reference colour channel can be simplified. For example, if the $K^{th}$ calibration sample 54 or region 56 includes only the background scattering, then a calibration concentration $c_j^o$ of the $j^{th}$ calibration sample ($1 \le j \le K-1$), which includes the pure (or substantially pure) $j^{th}$ analyte, using the 1st colour channel as the reference colour channel, may be approximated as:

$$c_j^0 = A_j^1 - A_K^1 \quad (16)$$

In which $A^1_j$ is the measured absorbance of the pure or substantially pure sample of the $j^{th}$ analyte corresponding to the $1^{st}$ colour channel. The calibration matrix C may be written as:

$$C = \begin{pmatrix} c_1^0 & 0 & \Lambda & 0 & 0 \\ 0 & c_2^0 & \Lambda & 0 & 0 \\ M & M & O & M & M \\ 0 & 0 & 0 & c_{K-1}^0 & 0 \\ c_s & c_s & c_s & c_s & c_s \end{pmatrix} \quad (17)$$

In which the dummy concentration $c_s = A^1_K$. In this special case, the calculation of the deconvolution matrix $CF^{-1}$ may be simplified.

The calibration matrix C and the calculation of the deconvolution matrix $CF^{-1}$ may be simplified further if the absorbance of pure (or substantially pure) samples of the different analytes may be tested under conditions in which the background scattering is very low or negligible.

Application to One Analyte and Background Scattering

Simulations were conducted using the model described hereinbefore with reference to FIGS. 25 to 32 in a case where the blue dye concentration profile 98 was equal to zero at every position. The resulting simulated OPD signals 101*b*, 103*b* are as shown in FIGS. 29 and 30. The concentration values were chosen corresponding to absorbance fingerprint values, and taking the values corresponding to the simulated green OLED (or green filter) as reference values. A first simulated calibration sample corresponding to gold nanoparticles having an optical density of OD=1 may be represented in the method by the concentration vector $c_{Au}^T = (1, 0)$ and the corresponding absorbance vector is $A_{Au}^T = (1, 0.02)$. The relevant absorbance values were obtained as absorbance fingerprint values as described hereinbefore with reference to FIGS. 33 and 34. A second simulated calibration sample, corresponding to a blank porous strip 5 in the form of a nitrocellulose strip, may be represented in the method by the absorbance vector $A_{NC}^T = (0.01, 0.01)$, so that the dummy concentration is $c_s = 0.01$ and the corresponding concentration vector is $c_{NC}^T = (0, 0.01)$. The relevant absorbance values were obtained as absorbance fingerprint values, as described hereinbefore with reference to FIGS. 33 and 34. Thus, taking the green OLED wavelength range (see FIG. 25) as the reference, the calibration matrix C and fingerprint matrix F according to Equations 12 and 13 may be written as:

$$C = \begin{pmatrix} 1 & 0 \\ 0 & 0.01 \end{pmatrix} F = \begin{pmatrix} 1 & 0.01 \\ 0.02 & 0.01 \end{pmatrix} \quad (18)$$

The deconvolution matrix $CF^{-1}$ of Equation 15 may be calculated by inverting the fingerprint matrix F:

$$CF^{-1} = \begin{pmatrix} 1 & 0 \\ 0 & 0.01 \end{pmatrix}\begin{pmatrix} 1.020 & -1.020 \\ -2.041 & 102.041 \end{pmatrix} \quad (19)$$

$$CF^{-1} = \begin{pmatrix} 1.020 & -1.020 \\ -0.020 & 1.020 \end{pmatrix}$$

and substituting the deconvolution matrix $CF^{-1}$ into Equation 15 yields:

$$\begin{pmatrix} c_{Au} \\ c_{NC} \end{pmatrix} = \begin{pmatrix} 1.020 & -1.020 \\ -0.0020 & 1.020 \end{pmatrix}\begin{pmatrix} A_{green} \\ A_{NIR} \end{pmatrix} \quad (20)$$

Thus, the concentration $c^{Au}$ of gold nanoparticles, in this example expressed in terms of absorbance in OD, is given as $c_{Au} = 1.02(A_{green} - A_{NIR})$, which is essentially the same result applied in Equation (4) of the first method.

Application to One Analyte and Background Scattering with a Coloured Dye

Simulations were also conducted using the model described hereinbefore with reference to FIGS. 25 to 32 in a case where the blue dye concentration profile 98 was as shown in FIG. 27. The resulting simulated OPD signals 101, 102, 103 are shown in FIG. 28. The concentration values were chosen as absorbance values using the green LED emission wavelengths as reference.

Figure 35:
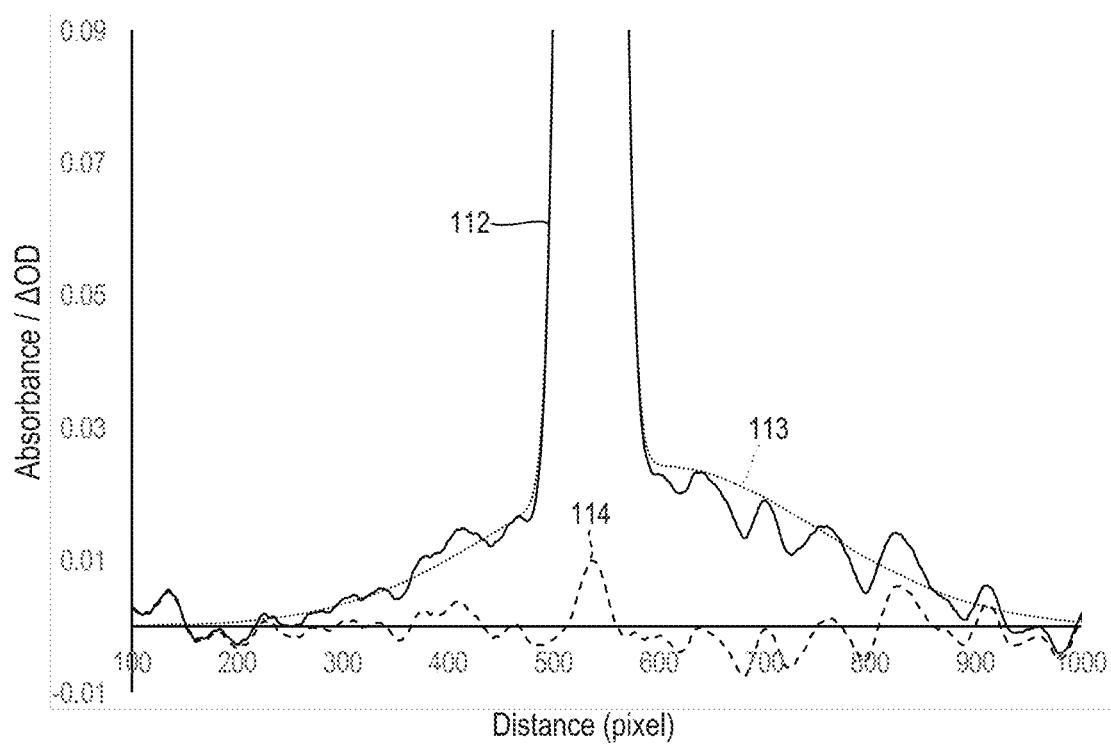
FIG. 35 illustrates analysing a three component simulated system using first and second wavelengths.

Referring also to FIG. 35, application of the simple two-colour difference method (see Equation (4)) to absorbance values obtained based on the simulated OPD signals 101, 102, 103 leads to inaccuracy in determining the change in absorbance due to the gold nanoparticles when only the green and NIR simulated OPD signals 101, 103 are considered.

The total, summed absorbance 112 is represented by a solid line. The estimated gold nanoparticle concentration 113 is represented by a dotted line. The estimated background scattering from the nitrocellulose strip 114 is represented by the dashed line.

In particular, the presence of the blue dye leads to errors in the estimated gold nanoparticle concentration 113. In particular, the baseline absorbance around the location of the gold nanoparticles is distorted by absorbance of the blue dye. The problem is that there are three unknowns in the concentration values, namely, the gold nanoparticle concentration $c_{Au}$, the blue dye concentration $c_{dye}$ and the background scattering $c_{NC}$ from the nitrocellulose strip. Using green and NIR OLEDs, there are only two measurements. The solution is to increase the number of wavelength ranges to three.

The second method utilising the deconvolution method may be applied if all three of the simulated OPD signals 101, 102, 103 are utilised. A first simulated calibration sample, corresponding to gold nanoparticles having an optical density of OD=1, may be represented in the method by the concentration vector $c_{Au}^T=(1, 0, 0)$ ($c_{Au}$, $c_{dye}$, $c_{NC}$) and the corresponding absorbance vector is $A_{AU}^T=(1, 0.17, 0.02)$ (green, red, NIR). The relevant absorbance values were obtained as absorbance fingerprint values according to a method analogous to that described hereinbefore with reference to FIGS. 33 and 34. A second simulated calibration sample, corresponding to the blue dye, may be represented in the method by the concentration vector $c_{dye}^T=(0, 0.024, 0)$ and the corresponding absorbance vector is $A_{Au}^T=(0.024, 0.89, 0)$. The relevant absorbance values were obtained as absorbance fingerprint values according to a method analogous to that described hereinbefore with reference to FIGS. 33 and 34. A third simulated calibration sample, corresponding to a blank porous strip, has an absorbance vector of $A_{NC}^T=(0.01, 0.01, 0.01)$, so that the dummy concentration $c_s=0.01$ and the corresponding concentration vector is $c_{NC}^T=(0, 0, 0.01)$. The relevant absorbance values were obtained as absorbance fingerprint values according to a method analogous to that described hereinbefore with reference to FIGS. 33 and 34. Thus, taking the green wavelength as reference wavelength, the calibration matrix C and fingerprint matrix F according to Equations 12 and 13 may be written as:

$$c = \begin{pmatrix} 1 & 0 & 0 \\ 0 & 0.024 & 0 \\ 0 & 0 & 0.01 \end{pmatrix} \quad F = \begin{pmatrix} 1 & 0.024 & 0.01 \\ 0.17 & 0.89 & 0.01 \\ 0.02 & 0 & 0.01 \end{pmatrix} \quad (21)$$

The deconvolution matrix $CF^{-1}$ of Equation 15 may be calculated by inverting the fingerprint matrix F:

$$CF^{-1} = \begin{pmatrix} 1 & 0 & 0 \\ 0 & 0.024 & 0 \\ 0 & 0 & 0.01 \end{pmatrix} \begin{pmatrix} 1.025 & -0.028 & -0.997 \\ -0.173 & 1.128 & -0.956 \\ -2.049 & 0.055 & 101.994 \end{pmatrix} \quad (22)$$

-continued $$CF^{-1} = \begin{pmatrix} 1.025 & -0.028 & -0.997 \\ -0.004 & 0.027 & -0.023 \\ -0.02 & 0.001 & 1.020 \end{pmatrix}$$

and substituting the deconvolution matrix $CF^{-1}$ into Equation 15 yields:

$$\begin{pmatrix} c_{Au} \\ c_{dye} \\ c_{NC} \end{pmatrix} = \begin{pmatrix} 1.025 & -0.028 & -0.997 \\ -0.004 & 0.027 & -0.023 \\ -0.02 & 0.001 & 1.020 \end{pmatrix} \begin{pmatrix} A_{green} \\ A_{red} \\ A_{NIR} \end{pmatrix} \quad (23)$$

Thus, the concentration $c_{Au}$ of gold nanoparticles, in this example expressed in terms of change in absorbance in OD, is given as $c_{Au}=1.025A_{green}-0.028A_{red}-0.997A_{NIR}$. This result may be applied to estimated absorbance values corresponding to a sample 3 without the need to plot a scatterplot to determine an absorbance fingerprint.

Figure 36:
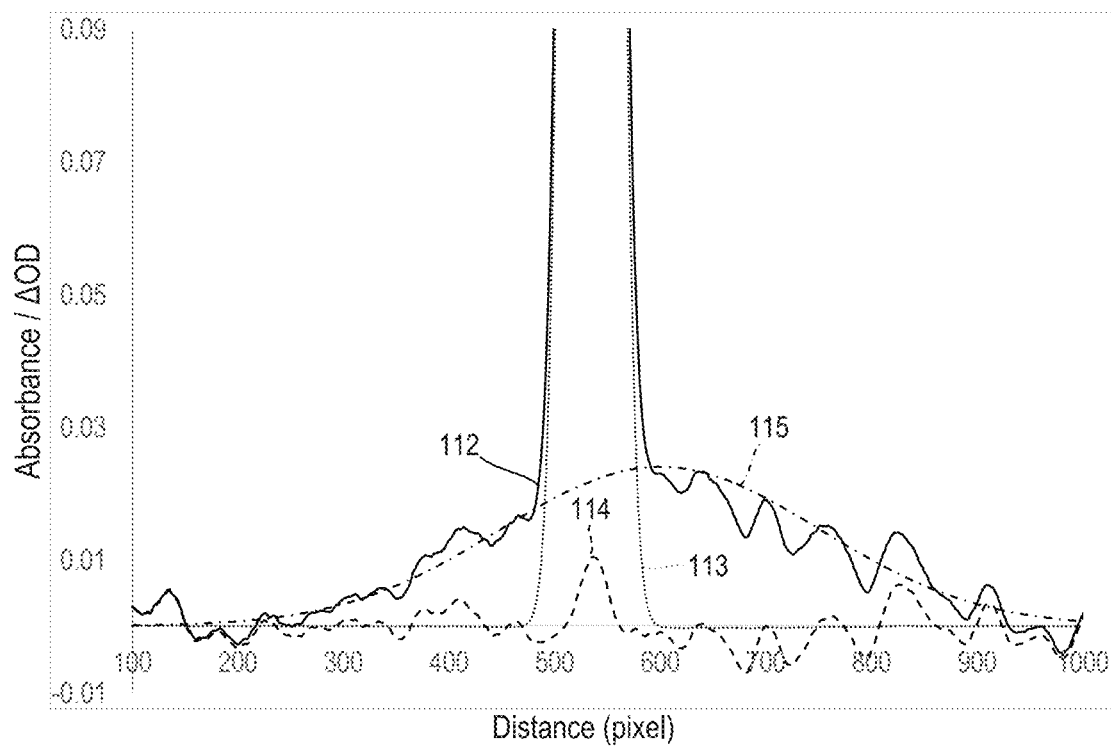
FIG. 36 illustrates analysing a three component simulated system using first, second and third wavelengths.

Referring also to FIG. 36, the total, summed absorbance 112 is represented by a solid line. The estimated gold nanoparticle concentration 113 is represented by a dotted line. The estimated background scattering from the nitrocellulose strip 115 is represented by the dashed line. The estimated concentration of the blue dye 115 is represented by the chained line.

It can be seen that applying the second method using three colour channels (green, red and NIR) is expected to allow for clear separation of the change in absorbance due to the gold nanoparticles, blue dye and the nitrocellulose strip. In particular, the estimated gold nanoparticle concentration 113 and the estimated concentration of the blue dye 115 are expected to be separable.

MODIFICATIONS

It will be appreciated that many modifications may be made to the embodiments hereinbefore described. Such modifications may involve equivalent and other features which are already known in relation to colorimetric analysis and which may be used instead of or in addition to features already described herein. Features of one embodiment may be replaced or supplemented by features of another embodiment.

For example, the preceding methods have been described in relation to still images. However, the methods may equally be applied to some or each frame of a video. In other words, the sample images $I^S$ may be extracted as the whole image or sub-regions 52, 57 of an individual frame of a video. In this way, colorimetric analysis may be dynamic. For example, the rate of development of a colour associated with an analyte may be determined for the test region 7 of a lateral flow device 10, 25.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention.

The applicant hereby gives notice that new claims may be formulated to such features and/or combinations of such features during the prosecution of the present application or of any further application derived therefrom.

The invention claimed is:

1. A method comprising:
   determining the presence or concentration of one or more analytes in a sample, comprising:
   receiving a first image containing an image of the sample, the first image obtained using an image sensor comprising detectors arranged in rows and columns, the image sensor having two or more colour channels;
   extracting, from the first image, a mono-colour array corresponding to each colour channel, wherein each mono-colour array comprises one or more entries and each entry is determined by aggregating one or more pixels of the first image;
   determining a mono-colour absorbance array corresponding to each colour channel, wherein each entry of a mono-colour absorbance array corresponding to a given colour channel is determined by calculating an absorbance value based on the corresponding entry of the mono-colour array of the given colour channel;
   determining, for each entry of the mono-colour absorbance arrays, a concentration vector by:
   generating an absorbance vector using the absorbance values from corresponding entries of each of the mono-colour absorbance arrays;
   determining the concentration vector by multiplying the absorbance vector with a de-convolution matrix;
   wherein each concentration vector includes a concentration value corresponding to each of the one or more analytes.

2. A method according to claim 1, wherein each entry of each mono-colour array corresponds to:
   an aggregate of a row or a column of the first image;
   an aggregate of the pixels of the first image within a region of interest; or
   a single pixel of the first image, wherein each mono-colour array is a mono-colour image.

3. A method according to claim 1, wherein receiving the first image comprises using the image sensor to obtain the first image.

4. A method according to claim 1, wherein the image sensor comprises red, green and blue colour channels.

5. A method according to claim 1, wherein the image sensor comprises an infra-red colour channel.

6. A method comprising applying the method according to claim 1 to each frame of a video, wherein receiving a first image comprises extracting a frame from the video.

7. A method according to claim 3, wherein the sample is illuminated by ambient light.

8. A method according to claim 3, further comprising illuminating the sample using a light source, wherein the sample and image sensor are arranged to be screened from ambient light.

9. A method according to claim 3, further comprising arranging the sample within a sample holder having a fixed geometric relationship with the image sensor.

10. A method according to claim 1, wherein the first image is obtained using light transmitted through the sample.

11. A method according to claim 1, wherein the first image is obtained using light reflected from the sample.

12. A method according to claim 1, wherein the image sensor forms part of a mobile device.

13. A method according to claim 12, wherein the mobile device comprises one or more processors, and wherein the step of determining the presence or concentration of one or more analytes is carried out by the one or more processors.

14. A method according to claim 1, wherein receiving the first image comprises:
   receiving a full sensor image which contains the image of the sample;
   identifying a first sub-region of the full sensor image which contains the sample;
   obtaining the first image by extracting the first sub-region.

15. A method of determining a de-convolution matrix, the method comprising:
   providing a number, K, of calibration samples, wherein each calibration sample comprises a known concentration of K different analytes;
   for each calibration sample:
      determining, for each of a number K of colour channels, the absorbance values of the calibration sample;
      generating an absorbance vector using the number K of absorbance values;
      generating a concentration vector using the number K of known concentrations of analytes;
   generating a first K by K matrix by setting the values of each column, or each row, to be equal to the values of the absorbance vector corresponding to a given calibration sample;
   inverting the first matrix;
   generating a second K by K matrix by setting the values of each column, or each row, to be equal to the values of the concentration vector corresponding to a given calibration sample;
   determining a deconvolution matrix by multiplying the second matrix by inverse of the first matrix.

16. A method according to claim 3, wherein the sample is illuminated by a broadband light source.

17. A method according to claim 3, wherein the sample is illuminated by a white light source.

* * * * *